(12) United States Patent
Tanaka et al.

(10) Patent No.: US 9,304,251 B2
(45) Date of Patent: Apr. 5, 2016

(54) PLASTIC OPTICAL FIBER AND METHOD FOR ITS PRODUCTION

(71) Applicant: Asahi Glass Company, Limited, Tokyo (JP)

(72) Inventors: Toshiyuki Tanaka, Tokyo (JP); Nobuyuki Kasahara, Tokyo (JP); Masakuni Sato, Tokyo (JP); Hiroshi Yamamoto, Tokyo (JP); Susumu Saito, Tokyo (JP); Tetsuji Shimohira, Tokyo (JP); Yoshinobu Takano, Tokyo (JP); Naoto Ota, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 14/636,698

(22) Filed: Mar. 3, 2015

(65) Prior Publication Data

US 2015/0177456 A1 Jun. 25, 2015

Related U.S. Application Data

(63) Continuation of application No. PCT/JP2013/073415, filed on Aug. 30, 2013.

(30) Foreign Application Priority Data

Sep. 11, 2012 (JP) ................................ 2012-199551

(51) Int. Cl.
*G02B 6/036* (2006.01)
*D01D 5/34* (2006.01)
(Continued)

(52) U.S. Cl.
CPC ........ *G02B 6/02038* (2013.01); *B29C 47/0004* (2013.01); *B29C 47/065* (2013.01);
(Continued)

(58) Field of Classification Search
CPC .... G02B 6/02038; G02B 6/036; G02B 1/046; G02B 1/048; B29C 47/0004; B29C 47/065; B29C 47/4792

USPC ....................... 385/128; 264/172.15
See application file for complete search history.

(56) References Cited

U.S. PATENT DOCUMENTS 5,155,796 A * 10/1992 Oonishi ................. G02B 1/046
                                                       385/143

FOREIGN PATENT DOCUMENTS

JP          63-238111          10/1988
JP          63-238115          10/1988
(Continued)

OTHER PUBLICATIONS

International Search Report issued in International Application No. PCT/JP2013/073415, dated Oct. 22, 2013.

*Primary Examiner* — Jerry Blevins
(74) *Attorney, Agent, or Firm* — Oblon, McClelland, Maier & Neustadt, L.L.P

(57) ABSTRACT

To provide a plastic optical fiber using amorphous fluorinated polymers whereby transmission loss and bending loss are low, no cracking takes place during stretching, and a wide range of molding conditions is acceptable.
A plastic optical fiber comprising an inner layer, an outer layer having a refractive index lower than the refractive index of the inner layer, and a protective coating layer covering the outer periphery of the outer layer, wherein the inner layer contains an amorphous fluorinated polymer (a) having no C—H bond, the outer layer contains an amorphous fluorinated polymer (c) which may have a C—H bond only at a terminal of the main chain, the glass transition temperature (Tgc) of the fluorinated polymer (c) is at least the glass transition temperature (Tga) of the fluorinated polymer (a), the plastic optical fiber is a stretched one, the fracture elongation of the fluorinated polymer (a) and the fracture elongation of the fluorinated polymer (c) are at least 120% and larger than the stretching ratio.

15 Claims, 4 Drawing Sheets

(51) Int. Cl.
  *G02B 6/02* (2006.01)
  *B29C 47/06* (2006.01)
  *B29C 47/92* (2006.01)
  *G02B 1/04* (2006.01)
  *B29C 47/00* (2006.01)
  *B29L 11/00* (2006.01)
  *B29K 27/12* (2006.01)

(52) U.S. Cl.
  CPC ............... *B29C 47/92* (2013.01); *G02B 1/046* (2013.01); *G02B 1/048* (2013.01); *G02B 6/036* (2013.01); *B29C 47/0014* (2013.01); *B29C 47/0057* (2013.01); *B29C 2947/92704* (2013.01); *B29K 2027/12* (2013.01); *B29L 2011/0075* (2013.01)

(56) References Cited

FOREIGN PATENT DOCUMENTS

| | | |
|---|---|---|
| JP | 4-204506 | 7/1992 |
| JP | 7-234322 A | 9/1995 |
| JP | 8-5848 | 1/1996 |
| JP | 8-334634 | 12/1996 |
| JP | 9-54201 | 2/1997 |
| JP | 11-95044 | 4/1999 |
| JP | 11-167030 | 6/1999 |
| JP | 11-183738 | 7/1999 |
| JP | 11-228638 | 8/1999 |
| JP | 2000-356716 | 12/2000 |
| JP | 2001-124938 | 5/2001 |
| JP | 2002-71972 | 3/2002 |
| JP | 2007-79508 | 3/2007 |

* cited by examiner

PLASTIC OPTICAL FIBER AND METHOD FOR ITS PRODUCTION

TECHNICAL FIELD

The present invention relates to a plastic optical fiber having a protective coating layer, and a method for its production.

BACKGROUND ART

A plastic optical fiber is known wherein an amorphous fluorinated polymer is used as the material forming a core and a clad, and a protective coating layer is provided outside the clad (Patent Documents 1 and 2). Patent Documents 1 and 2 disclose that in the core, an amorphous fluorinated polymer having no C—H bond is used as a matrix, and a compound having a refractive index different from the matrix is distributed with a concentration gradient in the radial direction to form a gradient index structure.

PRIOR ART DOCUMENTS

Patent Documents

Patent Document 1: JP-A-2002-71972
Patent Document 2: JP-A-2007-79508

DISCLOSURE OF INVENTION

Technical Problem

A plastic optical fiber is known to be useful for indoor wiring, notebook PCs, clamshell phones, etc. In such an environment, the optical fiber is required to have mechanical strength in addition to the characteristics of an optical fiber such that transmission loss is low and bending loss (optical loss due to a change of a transmission mode expected for transmission in an axial direction to an eradiation mode depending upon the bending state of the optical fiber) is low. In order to improve mechanical strength of an optical fiber, it is known to exert stretching to an optical fiber having a protective coating layer.

According to findings by the present inventors, when stretching is exerted to an optical fiber having a protective coating layer, cracks are likely to be formed in the core and the clad, whereby the transmission loss and bending loss tend to be large. The material forming a clad as disclosed in Patent Documents 1 and 2 has many ring structures, whereby cracks are likely to be formed during the stretching.

It is an object of the present invention to provide a plastic optical fiber using amorphous fluorinated polymers whereby transmission loss and bending loss are low, no cracks are formed during stretching, and a wide range of molding conditions is acceptable, and to provide a method for its production.

Solution To Problem

The present invention provides a plastic optical fiber and a method for its production, having the following constructions [1] to [15].

[1] A plastic optical fiber comprising an inner layer, an outer layer covering the outer periphery of the inner layer and having a refractive index lower than the refractive index of the inner layer, and a protective coating layer covering the outer periphery of the outer layer, wherein the material forming the inner layer contains an amorphous fluorinated polymer (a) having no C—H bond, the material forming the outer layer contains an amorphous fluorinated polymer (c) which may have a C—H bond only at a terminal of the main chain, the glass transition temperature (Tgc) of the fluorinated polymer (c) is at least the glass transition temperature (Tga) of the fluorinated polymer (a), the plastic optical fiber is a stretched one, the following fracture elongation of the fluorinated polymer (a) and the following fracture elongation of the fluorinated polymer (c) are at least 120% and larger than the stretching ratio in the above stretching,

[Fracture Elongation of Fluorinated Polymer]

a fluorinated polymer film having a thickness of 200 μm is punched out in a shape of a test piece type L stipulated in ASTM D1822 to form a test piece; in accordance with JIS K7161-1994, a tensile test of the test piece is conducted at a tensile speed of 10 mm/min. at the glass transition temperature of the material forming the protective coating film, whereupon the fracture elongation (%) of the fluorinated polymer is calculated from the following formula (II):

$$\text{Fracture elongation of fluorinated polymer} = \text{increase in gauge length of the test piece at the time of fracture/gauge length of the test piece before the tensile test} \times 100 \quad \text{(II)}.$$

[2] The plastic optical fiber according to [1], wherein the fluorinated polymer (c) is a fluorinated polymer having no C—H bond.

[3] The plastic optical fiber according to [1] or [2], wherein the fluorinated polymer (c) is a copolymer which contains the following units (A) and units (B) and further contains one or both of units (C) and units (D):

units (A): units formed by cyclopolymerization of a fluorinated monomer having at least two polymerizable double bonds, units (B): units formed by polymerization of a monomer having a polymerizable double bond between a carbon atom constituting a ring and a carbon atom not constituting a ring, or a monomer having a polymerizable double bond between two carbon atoms constituting a ring, units (C): units formed by polymerization of a perfluoroolefin or a perfluoroolefin containing a halogen atom other than a fluorine atom, units (D): units formed by polymerization of a perfluorovinyl ether monomer.

[4] The plastic optical fiber according to [3], wherein the fluorinated polymer (c) is a copolymer comprising the above units (A), units (B) and units (C) in a ratio of the units (A):(B):(C) being from 30 to 75:from 20 to 50:from 5 to 33 (mol %), a copolymer comprising the above units (A), units (B) and units (D) in a ratio of the units (A):(B):(D) being from 30 to 70:from 20 to 50:from 1 to 20 (mol %), or a copolymer comprising the above units (A), units (B), units (C) and units (D) in a ratio of the units (A):(B):(C):(D) being from 30 to 70:from 20 to 50:from 5 to 30: from 1 to 19 (mol %).

[5] The plastic optical fiber according to [3], wherein the fluorinated polymer (c) is a copolymer comprising the above units (A), units (B) and units (C) in a ratio of the units (A):(B):(C) being from 17 to 75:from 20 to 50:from 5 to 33 (mol %), a copolymer comprising the above units (A), units (B) and units (D) in a ratio of the units (A):(B):(D) being from 40 to 65:from 20 to 40:from 5 to 20 (mol %), or a copolymer comprising the above units (A), units (B), units (C) and units (D) in a ratio of the units (A):(B):(C):(D) being from 1 to 74:from 20 to 50:from 5 to 30: from 1 to 19 (mol %).

[6] The plastic optical fiber according to [1] or [2], wherein the fluorinated polymer (c) is a copolymer comprising the above units (B) and units (C).

[7] The plastic optical fiber according to [6], wherein the fluorinated polymer (c) is a copolymer comprising the above units (B) and units (C) in a ratio of the units (B):(C). being from 50 to 95:from 5 to 50 (mol %).

[8] The plastic optical fiber according to any one of [1] to [7], wherein the refractive index of the fluorinated polymer (c) is lower by at least 0.003 than the refractive index of the fluorinated polymer (a).

[9] The plastic optical fiber according to any one of [1] to [8], wherein the fluorinated polymer (a) is a polymer having only units formed by cyclopolymerization of a fluorinated monomer having at least two polymerizable double bonds.

[10] The plastic optical fiber according to any one of [1] to [8], wherein the fluorinated polymer (a) is a copolymer which contains the following units (A) and units (B) and further contains one or both of units (C) and units (D):

units (A): units formed by cyclopolymerization of a fluorinated monomer having at least two polymerizable double bonds, units (B): units formed by polymerization of a monomer having a polymerizable double bond between a carbon atom constituting a ring and a carbon atom not constituting a ring, or a monomer having a polymerizable double bond between two carbon atoms constituting a ring, units (C): units formed by polymerization of a perfluoroolefin or a perfluoroolefin containing a halogen atom other than a fluorine atom, units (D): units formed by polymerization of a perfluorovinyl ether monomer.

[11] The plastic optical fiber according to [10], wherein the fluorinated polymer (a) is a copolymer comprising the above units (A), units (B) and units (C) in a ratio of the units (A):(B):(C) being from 30 to 75:from 20 to 50:from 5 to 33 (mol %), a copolymer comprising the above units (A), units (B) and units (D) in a ratio of the units (A):(B):(D) being from 30 to 70:from 20 to 50:from 1 to 20 (mol %), or a copolymer comprising the above units (A), units (B), units (C) and units (D) in a ratio of the units (A):(B):(C):(D) being from 30 to 70:from 20 to 50:from 5 to 30: from 1 to 19 (mol %).

[12] The plastic optical fiber according to any one of [1] to [11], wherein the fluorinated polymer (a) is a fluorinated polymer having a fluorinated aliphatic cyclic structure in its main chain.

[13] The plastic optical fiber according to any one of [1] to [12], wherein the inner layer contains, in a matrix composed of the fluorinated polymer (a), a compound (b) having a refractive index higher than the fluorinated polymer (a), and a gradient index structure is formed by distribution of the compound (b).

[14] The plastic optical fiber according to any one of [1] to [13], wherein the glass transition temperature of the material forming the protective coating layer is from 100 to 150° C.

[15] A method for producing the plastic optical fiber as defined in any one of [1] to [14], which comprises spinning, while stretching in an axial direction, a multi-layer structure wherein the fluorinated polymer (a) is disposed at its center, and a layer of the fluorinated polymer (c) and a layer of the material forming the protective coating layer are disposed concentrically in a radial direction from the center.

Advantageous Effects of Invention

According to the present invention, it is possible to obtain a plastic optical fiber using amorphous fluorinated polymers whereby transmission loss and bending loss are low, no cracks are formed during stretching, and a wide range of molding conditions is acceptable.

DESCRIPTION OF EMBODIMENTS

Figure 1:
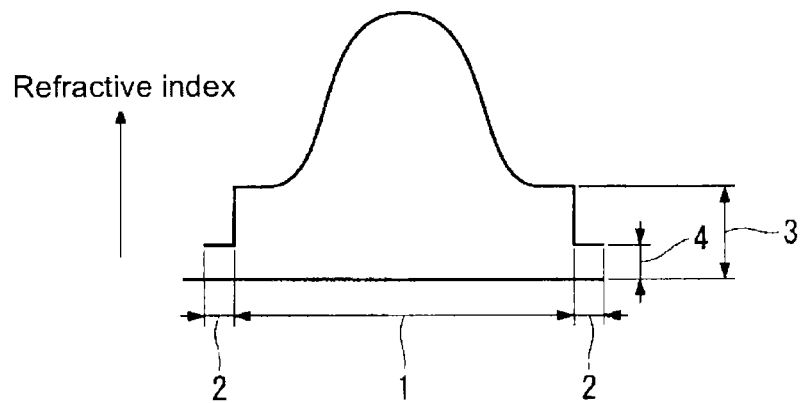
FIG. 1 is an example of the refractive index distribution in a radial direction of a plastic optical fiber of the present invention.

In this specification, a fiber having a double layer structure of an inner layer and an outer layer will be referred to as a "plastic optical fiber bare wire" (hereinafter referred to also as an "optical fiber bare wire"), and a fiber having at least one layer of a protective coating layer formed on a plastic optical fiber bare wire will be referred to as a "plastic optical fiber" (hereinafter referred to also as an "optical fiber").

Usually, a cross-sectional shape vertical to the length direction of an optical fiber bare wire is circular, and in such a cross-section of an optical fiber bare wire, the inner layer is circular, and the outer layer has a circular ring shape concentric to the inner layer.

In this specification, a "unit" in a polymer is meant for a constituting portion formed from one molecule of a monomer. A polymer has a structure having many "units" linked to one another, and at least two types of "units" may be present in a polymer.

In this specification, a main chain is a linear molecular chain whereby all molecular chains other than the main chain are regarded as side chains. A main chain of a polymer formed by polymerization of a monomer having a polymerizable double bond (an unsaturated double bond between carbon atoms) is composed of carbon atoms linked to one another.

In this specification, a number average molecular weight (Mn) is a molecular weight calculated as polystyrene, which is obtainable as measured by gel permeation chromatography by using a calibration curve prepared by using standard polystyrene having a known molecular weight.

[Plastic Optical Fiber]

The plastic optical fiber of the present invention comprises an inner layer, an outer layer covering the outer periphery of the inner layer and having a refractive index lower than the refractive index of the inner layer, and a protective coating layer covering the outer periphery of the outer layer.

The material forming the inner layer of the present invention contains an amorphous fluorinated polymer (a) having no C—H bond. It is preferably a layer which contains, in a matrix composed of the fluorinated polymer (a), a compound (b) having a refractive index different from the fluorinated polymer (a) and in which a gradient index structure is formed by distribution of the compound (b). Here, an optical fiber wherein the inner layer has a gradient index structure will be referred to as a "gradient index optical fiber", and the optical fiber of the present invention is preferably a gradient index optical fiber in that modal dispersion is thereby less likely to occur and the transmission band is thereby increased.

The material forming the outer layer of the present invention contains an amorphous fluorinated polymer (c) which may have a C—H bond only at a terminal of its main chain.

Preferred embodiments of the gradient index optical fiber will be described with reference to FIGS. 1 to 4. FIGS. 1 to 4 are graphs showing refractive index distributions, wherein the abscissa represents the diameter of an optical fiber bare wire, and the ordinate represents the refractive index. The inner layer (a range shown by symbol 1) of the optical fiber bare wire has a refractive index distribution such that the refractive index is highest at the center, and the refractive index gradually decreases as the position departs from the center. Symbol 3 shows the refractive index level of the outer most portion of the inner layer, and symbol 4 shows the refractive index level of the outer layer (a range shown by symbol 2). The refractive index 4 of the outer layer is lower than the refractive index 3 of the outer most portion of the inner layer.

Figure 2:
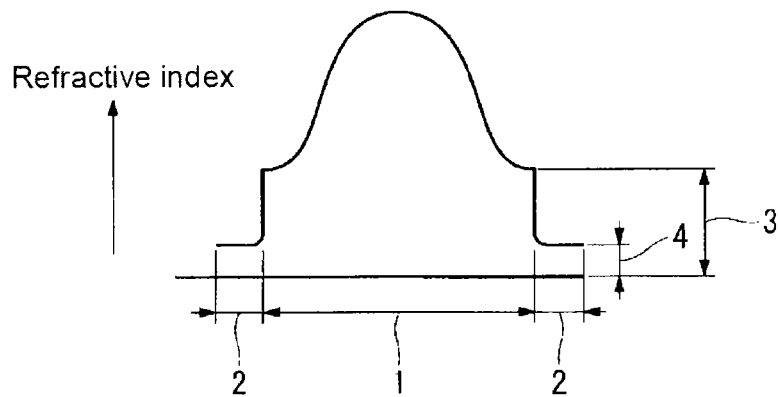
FIG. 2 is an example of the refractive index distribution in a radial direction of a plastic optical fiber of the present invention.
Figure 3:
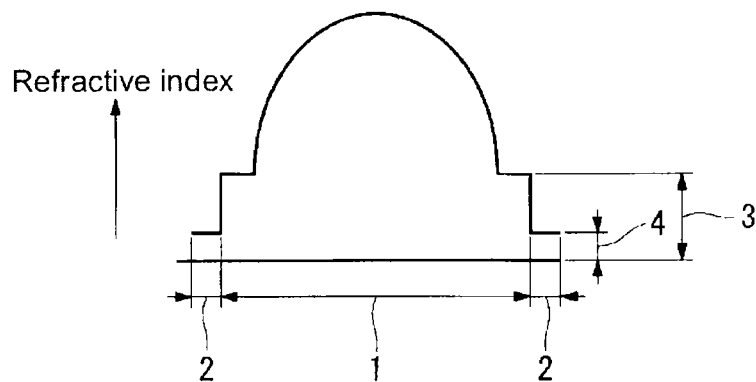
FIG. 3 is an example of the refractive index distribution in a radial direction of a plastic optical fiber of the present invention.
Figure 4:
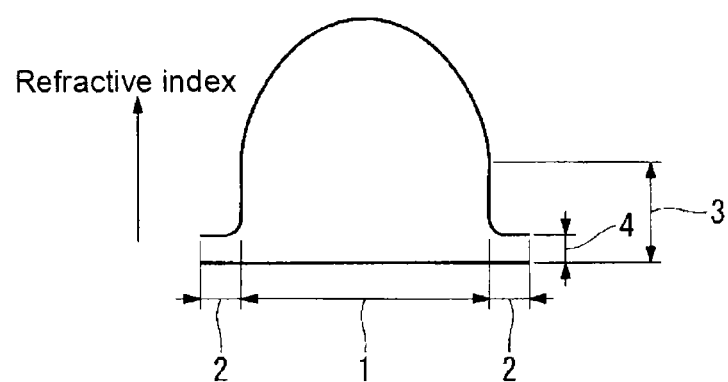
FIG. 4 is an example of the refractive index distribution in a radial direction of a plastic optical fiber of the present invention.

The refractive index distribution of the inner layer may be a sine curve distribution where the inclination of the graph gradually becomes small towards outer periphery as shown in FIGS. 1 and 2, or a parabolic distribution where the inclination of the graph gradually becomes large towards outer periphery as shown in FIGS. 3 and 4. The latter parabolic refractive index distribution is preferred, from such a viewpoint that the transmission band is large. On the other hand, it may be a distribution where the refractive index continuously decreases to the outer most portion of the inner layer as shown in FIGS. 2 and 4, or one where the refractive index continuously decreases from the center to a certain point of the inner layer and the inner layer outside thereof has a constant refractive index, as shown in FIGS. 1 and 3. In FIGS. 2 and 4, the inner layer functions as a core layer, and the outer layer functions as a clad. Further, in FIGS. 1 and 3, the portion of the inner layer where the refractive index is constant functions as a first clad, the outer layer functions as a second clad, and the remaining portion functions as a core.

The thickness of the inner layer (the distance from the center of the optical fiber to the outer most portion of the inner layer, i.e. the radius of the inner layer) is not particularly limited, but is preferably from 10 to 1,000 μm, more preferably from 20 to 500 μm, particularly preferably from 30 to 200 μm. The thickness of the outer layer is not particularly limited, but is preferably from 2 to 1,000 μm, more preferably from 5 to 500 μm, particularly preferably from 10 to 200 μm.

In the present invention, the glass transition temperature (Tgc) (° C.) of the fluorinated polymer (c) is at least the glass transition temperature (Tga) (° C.) of the fluorinated polymer (a). The reason is considered to be as follows. If Tga of the inner layer is higher than Tgc of the outer layer, it is likely that during the molding of the optical fiber, the inner layer solidifies faster than the outer layer, and the solidified inner layer is pulled by the outer layer, whereby molecular orientation is caused in the inner layer, and the transmission loss of the obtainable fiber tends to be large.

In a case where a mixture of at least two types of polymers is to be used as the fluorinated polymer (c) constituting the outer layer, when at least two types of polymers are mixed sufficiently uniformly, Tg of the mixture appears as one Tg corresponding to the mass ratio of the respective polymers. In such a case, such one Tg of the mixture is the above Tgc. However, when the mixture is not sufficiently uniform, a plurality of Tg (at least two Tg) attributable to the respective polymers may appear. In such a case, each of such at least two Tg appearing with respect to the fluorinated polymer (c) is preferably at least the glass transition temperature Tga of the fluorinated polymer (a).

Likewise in a case where a mixture of at least two types of polymers is to be used as the fluorinated polymer (a), when one Tg appears, such one Tg of the mixture is the above Tga. When a plurality of Tg (at least two Tg) attributable to the respective polymers appear as Tg of the mixture, it is preferred that the glass transition temperature Tgc of the fluorinated polymer (c) is at least Tg which is highest among the at least two Tg appearing with respect to the fluorinated polymer (a).

From such a viewpoint that the bending loss of the optical fiber can be made small, the refractive index 4 of the outer layer is preferably lower by at least 0.003, particularly preferably lower by at least 0.005, than the refractive index 3 of the outermost portion of the inner layer.

The numerical aperture NA calculated from the maximum refractive index of the center portion of the inner layer and the minimum refractive index of the outer layer, is preferably at least 0.20, more preferably at least 0.23, particularly preferably at least 0.25. Usually the upper limit of the numerical aperture is about 0.5. Generally, the bending loss changes also by the core diameter (the outside diameter of the portion functioning as the core layer), and as the core diameter becomes large, the bending loss also becomes large.

The optical fiber of the present invention is characterized in that the fracture elongation of the fluorinated polymer (a) and the fracture elongation of the fluorinated polymer (c) are at least 120% and larger than the stretching ratio (hereinafter sometimes referred to also as "fiber stretching ratio") in stretching. It is thereby possible to reduce the transmission loss and the bending loss of the optical fiber.

The reason as to why such effects are obtainable, is considered to be as follows. In the case of an optical fiber wherein the fiber stretching ratio is high, the material forming the protective coating layer is strongly oriented to the stretching direction during molding of the optical fiber. Accordingly, by increasing the fiber stretching ratio to a level of at least 120%, it is considered possible to bring the mechanical strength to be good.

Further, usually the majority of the cross-section of the optical fiber is occupied by a protective coating layer, and therefore, the fiber stretching ratio is considered to be determined by the stress exerted to such a protective coating layer. That is, the elongation degree in the vicinity of the glass transition temperature of the protective coating layer defines the fiber stretching ratio. From this, it is likely that by using such materials that the fracture elongation of the fluorinated polymer (a) and the fracture elongation of the fluorinated polymer (b) at the glass transition temperature of the material forming the protective coating layer are at most the fiber stretching ratio, during the molding of the optical fiber, the inner layer and the outer layer are stretched more than the fracture elongation of the fluorinated polymer (a) and the fracture elongation of the fluorinated polymer (c), respectively, and cracks are likely to be formed in the inner layer and the outer layer. If cracks are formed in the inner layer, the function as an optical fiber will be lost. Further, if cracks are formed in the outer layer, the light confinement function by the outer layer will be lost, and the value of numerical aperture NA decreases. Therefore, in order to produce a stretched optical fiber with low transmission loss constantly and in good yield, it is important to use, as materials to constitute the inner layer and the outer layer, fluorinated polymers (a) and (c) such that the fracture elongation of the fluorinated polymer (a) and the fracture elongation of the fluorinated polymer (c) are larger than the fiber stretching ratio at the glass transition temperature of the material constituting the protective coating layer.

In the present invention, the fracture elongation of the fluorinated polymer (a) and the fracture elongation of the fluorinated polymer (c) are, respectively, ones obtained by the following tensile test.

A fluorinated polymer film having a thickness of 200 μm is punched out in a shape of a test piece type L stipulated in ASTM D1822 to form a test piece. In accordance with JIS K7161-1994, a tensile test of the test piece is conducted at a tensile speed of 10 mm/min. at the glass transition temperature of the material forming the protective coating film, whereupon the fracture elongation (%) of the fluorinated polymer is calculated from the following formula (II):

Fracture elongation of fluorinated polymer=increase in gauge length of the test piece at the time of fracture/gauge length of the test piece before the tensile test×100       (II).

(Fluorinated Polymer (a))

The fluorinated polymer (a) as a material to form the inner layer is a fluorinated polymer which is amorphous and has no C—H bond to cause light absorption of near-infrared light. The refractive index of the fluorinated polymer (a) is preferably from 1.25 to 1.40, more preferably from 1.30 to 1.37, particularly preferably from 1.32 to 1.35.

The viscosity in a melted state of the fluorinated polymer (a) is preferably from $10^2$ to $10^5$ poise, particularly preferably from $10^3$ to $10^4$ poise. When the melt viscosity is at least the lower limit value in the above range, it becomes simple to bring the cross-sectional shape of the outer periphery close to a true circle. When it is at most the upper limit value in the above range, the melt spinning becomes simple. Further, in a case where the inner layer contains the compound (b), diffusion of the compound (b) in the matrix will be good, and the refractive index distribution tends to be easily formed.

The number average molecular weight (Mn) of the fluorinated polymer (a) is preferably from $1\times10^4$ to $5\times10^6$, particularly preferably from $5\times10^4$ to $1\times10^6$. When the number average molecular weight is at least the lower limit value in the above range, the heat resistance of the fluorinated polymer (a) is good, and when it is at most the upper limit value in the above range, in a case where the inner layer contains the compound (b), diffusion of the compound (b) in the matrix will be good, and the refractive index distribution tends to be easily formed. In a case where the number average molecular weight of the fluorinated polymer (a) is represented by the intrinsic viscosity [η], it is preferably from 0.1 to 1.0 dl/g, particularly preferably from 0.2 to 0.5 dL/g at 30° C. in perfluoro(2-butyltetrahydrofuran (hereinafter referred to also as "PBTHF").

The glass transition temperature (Tga)(° C.) of the fluorinated polymer (a) is preferably at least 70° C., since increase in the transmission loss due to thermal deformation is thereby small. Tga is adjusted to be at most the glass transition temperature (Tgc) (° C.) of the fluorinated polymer (c).

The fluorinated polymer (a) is selected depending upon the fiber stretching ratio in the optical fiber after the production and the material forming the protective coating layer, so that the fracture elongation of the fluorinated polymer (a) at the time of conducting a tensile test at the glass transition temperature of the material forming the protective coating layer, would be at least 120% and larger than the fiber stretching ratio.

The fluorinated polymer (a) is preferably a fluorinated polymer having an aliphatic cyclic structure, more preferably a fluorinated polymer having an aliphatic cyclic structure in the main chain, particularly preferably a fluorinated polymer having a fluorinated aliphatic cyclic structure in the main chain.

"Having an aliphatic cyclic structure in the main chain" means that at least one of carbon atoms constituting an aliphatic ring is a carbon atom in the carbon chain constituting the main chain. Further, "having a fluorinated aliphatic cyclic structure in the main chain" means to have such a structure that a fluorine atom or a fluorine-containing group is further bonded to at least one of carbon atoms constituting the aliphatic ring. The aliphatic ring may be an aliphatic ring composed solely of carbon atoms, or an aliphatic hetero ring composed of carbon atoms and hetero atom(s). The hetero atom to constitute an aliphatic hetero ring may, for example, be an oxygen atom or a nitrogen atom. As the fluorinated aliphatic cyclic structure, a fluorinated aliphatic ether cyclic structure having one or two oxygen atoms as hetero atoms, is particularly preferred.

From the viewpoint of transparency, the fluorinated polymer having a fluorinated aliphatic cyclic structure in the main chain is preferably a polymer containing at least 20 mol % of units having a fluorinated aliphatic cyclic structure per all units of the fluorinated polymer, particularly preferably a polymer containing at least 40 mol % of such units.

As the fluorinated polymer (a), copolymers (i) to (iv) containing the following units (A) to (D), or a homopolymer (v) composed solely of units (A), may be mentioned.

Units (A): units formed by cyclopolymerization of a fluorinated monomer having at least two polymerizable double bonds. The units (A) in the fluorinated polymer (a) may be one type only, or at least two types.

Units (B): units formed by polymerization of a monomer having a polymerizable double bond between a carbon atom constituting a ring and a carbon atom not constituting a ring, or a monomer having a polymerizable double bond between two carbon atoms constituting a ring. The units (B) in the fluorinated polymer (a) may be one type only, or at least two types.

Units (C): units formed by polymerization of a perfluoroolefin or a perfluoroolefin containing a halogen atom other than a fluorine atom. The units (C) in the fluorinated polymer (a) may be one type only, or at least two types. The perfluoroolefin containing a halogen atom other than a fluorine atom is meant for a compound having some of fluorine atoms in a perfluoroolefin substituted by halogen atoms other than fluorine atoms.

Units (D): units formed by polymerization of a perfluorovinyl ether monomer. The units (D) in the fluorinated polymer (a) may be one type only, or at least two types.

Copolymer (i): a copolymer comprising units (B) and units (C).

Copolymer (ii): a copolymer comprising units (A), units (B) and units (C).

Copolymer (iii): a copolymer comprising units (A), units (B) and units (D).

Copolymer (iv): a copolymer comprising units (A), units (B), units (C) and units (D).

Among the copolymers (i) to (iv), from the viewpoint of efficient adjustment of the physical properties such as the refractive index, melt viscosity, glass transition point, etc. of polymers, copolymers (ii), (iii) and (iv) are preferred as compared with copolymer (i), and further from such a viewpoint that the production is simple, copolymers (ii) and (iii) are particularly preferred.

The fluorinated polymer (a) is preferably a homopolymer from such a viewpoint that the transmission loss can thereby be made low, particularly preferably a homopolymer (v) composed solely of units (A) from such a viewpoint that Tga can easily be made lower than Tgc.

Further, the fluorinated polymer (a) may be a mixture of at least two types selected from the above copolymers (i) to (iv) and the homopolymer (v).

Now, units (A) to D will be described.

<Units (A)>

Units (A) are disclosed in e.g. JP-A-63-238111 or JP-A-63-238115.

Units (A) may, for example, be units represented by the following formulae (1) and (2).

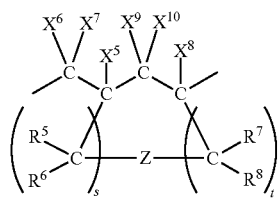

(1)

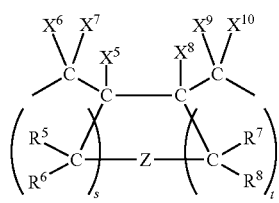

(2)

In the formula (1) or (2), each of $X^5$ to $X^{10}$ which are independent of one another, is a fluorine atom or a perfluoroalkyl group. Some of fluorine atoms may be substituted by chlorine atoms. Further, some of fluorine atoms in the perfluoroalkyl group may be substituted by chlorine atoms. The number of carbon atoms in the perfluoroalkyl group is preferably from 1 to 5, particularly preferably 1.

Z is an oxygen atom, a single bond or $-OC(R^9)(R^{10})O-$, preferably an oxygen atom.

Each of $R^5$ to $R^{10}$ which are independent of one another, is a fluorine atom, a perfluoroalkyl group or a perfluoroalkoxy group. Some of fluorine atoms may be substituted by chlorine atoms. Further, some of fluorine atoms in the perfluoroalkyl group and the perfluoroalkoxy group may be substituted by chlorine atoms. The number of carbon atoms in the perfluoroalkyl group and the perfluoroalkoxy group is preferably from 1 to 5, particularly preferably 1.

Each of s and t which are independent of each other, is an integer of from 0 to 5, and s+t is an integer of from 1 to 6 (provided that when Z is $-OC(R^9)(R^{10})O-$, s+t may be 0). However, when s+t is an integer of 2 or more, the types of substituents in the plurality of substituted methylene groups defined by the number may be different. It is preferred that each of s and t is an integer of from 0 to 4, and s+t is an integer of from 1 to 4.

Units represented by the formula (1) or (2) are formed by cyclopolymerization of the compound represented by the formula (3).

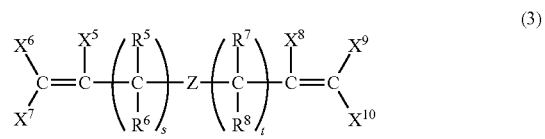

(3)

In the formula (3), Z, $X^5$ to $X^{10}$, $R^5$ to $R^8$, s and t are as defined above.

The compound represented by the formula (3) is preferably a compound wherein Z is an oxygen atom or $-OC(R^9)(R^{10})O-$, s is 0 or 1, t is an integer of from 0 to 4, and s+t is an integer of from 1 to 4 (provided that when Z is $-OC(R^9)(R^{10})O-$, s+t may be 0), each of $X^5$ to $X^{10}$ is a fluorine atom, or at most two of them are chlorine atoms, trifluoromethyl groups or chlorodifluoromethyl groups, with the rest being fluorine atoms, each of $R^5$ to $R^{10}$ which are independent of one another is a fluorine atom, a chlorine atom (provided that at most one is attached per one carbon atom), a trifluoromethyl group or a chlorodifluoromethyl group.

As the compound represented by the formula (3), compounds represented by the following formulae (4) to (6) are preferred. In the following formulae, $R^{71}$ and $R^{72}$ are the same as the above $R^7$ including the preferred embodiments. $R^{81}$ and $R^{82}$ are the same as the above $R^8$ including the preferred embodiments.

In the compound represented by the formula (4), it is preferred that $X^5$ to $X^{10}$ are all fluorine atoms, or one or two of them (provided at most one of $X^5$ to $X^7$ and at most one of $X^8$ to $X^{10}$) are chlorine atoms, with the rest being fluorine atoms. It is preferred that $R^7$ and $R^8$ are all fluorine atoms, or one of them is a chlorine atom or a trifluoromethyl group and the other is a fluorine atom.

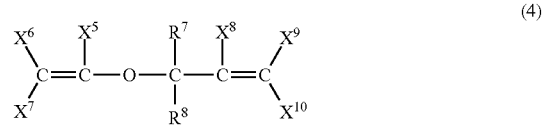

(4)

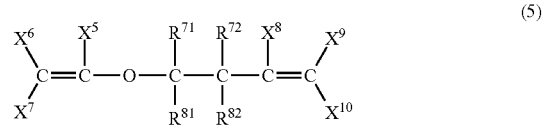

(5)

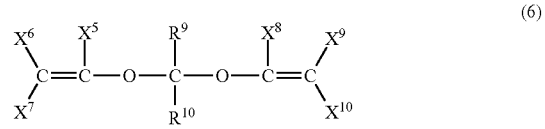

(6)

The following compounds may be mentioned as specific examples of the compounds represented by the formulae (4) to (6).

$CF_2=CFOCF_2CF=CF_2$, $CF_2=CFOCF(CF_3)CF=CF_2$, $CF_2=CFOCF_2CF_2CF=CF_2$, $CF_2=CFOCF(CF_3)CF_2CF=CF_2$, $CF_2$=$CFOCF_2CF(CF_3)CF$=$CF_2$, $CF_2$=$CFOCF_2CFClCF$=$CF_2$, $CF_2$=$CFOCCl_2CF_2CF$=$CF_2$, $CF_2$=$CFOCF_2CF_2CCl$=$CF_2$, $CF_2$=$CFOCF_2CF_2CF$=$CFCl$, $CF_2$=$CFOCF_2CF(CF_3)CCl$=$CF_2$, $CF_2$=$CFOCF_2OCF$=$CF_2$, $CF_2$=$CFOC(CF_3)_2OCF$=$CF_2$, $CF_2$=$CFOCCl_2OCF$=$CF_2$, $CF_2$=$CClOCF_2OCCl$=$CF_2$.

Units (A) contained in the fluorinated polymer (a) are particularly preferably units represented by the following formula (41) or (42) from such a viewpoint that the transmission loss of the optical fiber is thereby small. In the formula (41) or (42), one of d and e is 0, and the other is 1. Here, units represented by the formula (41) are units to be formed by cyclopolymerization of the above-mentioned $CF_2$=$CFOCF_2CF(CF_3)CF$=$CF_2$, and units represented by the formula (42) are units to be formed by cyclopolymerization of the above-mentioned $CF_2$=$CFOCF_2CF_2CF$=$CF_2$.

As units (A), particularly preferred are units represented by the formula (41), from such a viewpoint that the plastic optical fiber will thereby be excellent in heat resistance.

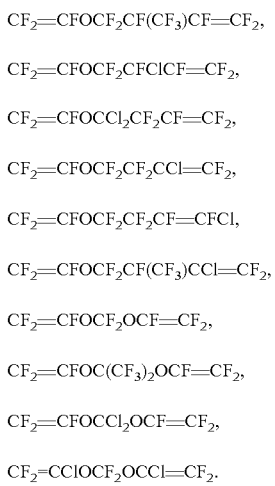

<Units (B)>

Among units (B), as units to be formed by polymerization of a monomer having a polymerizable double bond between a carbon atom constituting a ring and a carbon atom not constituting a ring, units represented by the following formula (7) are preferred.

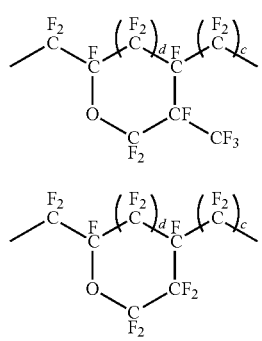

In the formula (7), each of $X^3$ and $X^4$ which are independent of each other, is a fluorine atom or a perfluoroalkyl group. Some of fluorine atoms may be substituted by chlorine atoms. Further, some of fluorine atoms in the perfluoroalkyl group may be substituted by chlorine atoms. The number of carbon atoms in the perfluoroalkyl group is preferably from 1 to 5, particularly preferably 1.

Each of $R^3$ and $R^4$ which are independent of each other, is a fluorine atom, a perfluoroalkyl group or a perfluoroalkoxy group. Some of fluorine atoms may be substituted by chlorine atoms. Further, some of fluorine atoms in the perfluoroalkyl group and the perfluoroalkoxy group may be substituted by chlorine atoms. The number of carbon atoms in the perfluoroalkyl group and the perfluoroalkoxy group is preferably from 1 to 5, particularly preferably 1.

$R^3$ and $R^4$ may together form a fluorinated aliphatic ring.

q is an integer of from 1 to 5, preferably 2.

Units represented by the formula (7) wherein q is 2, are formed by polymerization of a compound represented by the following formula (8) (i.e. a monomer having a polymerizable double bond between a carbon atom constituting a ring and a carbon atom not constituting a ring).

In the formula (8), $X^3$ and $X^4$ are as defined above. $R^{31}$ and $R^{32}$ are the same as the above $R^3$ including their preferred embodiments. $R^{41}$ and $R^{42}$ are the same as the above $R^4$ including their preferred embodiments. Each of $R^{31}$, $R^{32}$, $R^{41}$ and $R^{42}$ which are independent of one another is particularly preferably a fluorine atom, a trifluoromethyl group or a chlorodifluoromethyl group.

Compounds represented by the following formulae (9) to (11) may be mentioned as specific examples of the compound represented by the formula (8).

Among units (B), units to be formed by polymerization of a monomer having a polymerizable double bond between two carbon atoms constituting a ring, are preferably units represented by the following formula (12).

In the formula (12), each of $X^1$ and $X^2$ which are independent of each other, is a fluorine atom or a perfluoroalkyl group. Some of fluorine atoms may be substituted by chlorine atoms. Further, some of fluorine atoms in the perfluoroalkyl group may be substituted by chlorine atoms. The number of carbon atoms in the perfluoroalkyl group is preferably from 1 to 5, particularly preferably 1.

Each of $R^1$ and $R^2$ which are independent of each other, is a fluorine atom, a perfluoroalkyl group or a perfluoroalkoxy group. Some of fluorine atoms may be substituted by chlorine atoms. Further, some of fluorine atoms in the perfluoroalkyl group and the perfluoroalkoxy group may be substituted by chlorine atoms. The number of carbon atoms in the perfluoroalkyl group and the perfluoroalkoxy group is preferably from 1 to 5, particularly preferably 1.

$R^1$ and $R^2$ may together form a fluorinated aliphatic ring.

p is an integer of from 1 to 4, preferably 1 or 2.

Units represented by the formula (12) wherein p is 1 or 2, are formed by polymerization of a compound represented by the following formula (13) or (14) (i.e. a monomer having a polymerizable double bond between two carbon atoms constituting a ring).

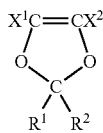
(13)

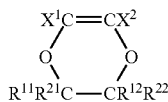
(14)

In the formulae (13) and (14), $X^1$ and $X^2$, and $R^1$ and $R^2$, are as defined above. $R^{11}$ and $R^{12}$ are the same as the above $R^1$ including their preferred embodiments. $R^{21}$ and $R^{22}$ are the same as the above $R^2$ including their preferred embodiments.

Compounds represented by the following formulae (15) to (23) may be mentioned as specific examples of the compounds represented by the formulae (13) and (14).

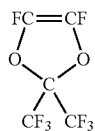
(15)

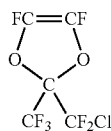
(16)

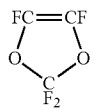
(17)

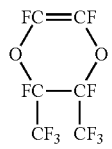
(18)

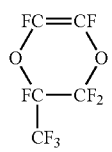
(19)

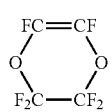
(20)

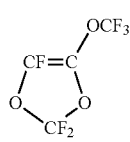
(21)

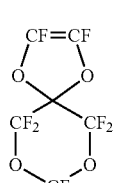
(22)

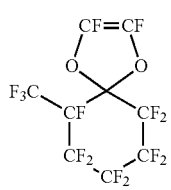
(23)

As units (B) contained in the fluorinated polymer (a), units represented by the following formula (43) are particularly preferred, whereby the refractive index can be made small.

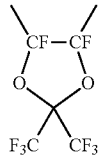
(43)

<Units (C)>

The perfluoroolefin to form units (C) by polymerization is preferably a $C_{2-4}$ perfluoroolefin, and tetrafluoroethylene, hexafluoropropene or the like may be mentioned. The perfluoroolefin containing a halogen atom other than a fluorine atom to obtain units (C) is preferably a $C_{2-4}$ perfluoroolefin having a halogen atom other than a fluorine atom, and chlorotrifluoroethylene or the like may be mentioned.

As units (C) contained in the fluorinated polymer (a), —($CF_2$—$CF_2$)— or —($CF_2$—CFCl)— is particularly preferred, since the fracture elongation of the fluorinated polymer (a) can thereby be made high.

<Units (D)>

The perfluorovinyl ether monomer to form units (D) by polymerization may, for example, be a perfluoro(alkyl vinyl ether) or a perfluoro{(alkoxyalkyl) vinyl ether} having an etheric oxygen atom between carbon atoms in the alkyl group of a perfluoro(alkyl vinyl ether).

In the above vinyl ether type monomer, the number of carbon atoms in the alkyl moiety (the alkyl group or the alkoxyalkyl group bonded via —O— to a carbon atom of a vinyl group) which may have an etheric oxygen atom, is preferably at most 10.

As units (D) contained in the fluorinated polymer (a), —($CF_2$—CF(OCF))—, —($CF_2$—CF(O$C_3F_7$))— and —($CF_2$—CF(O$CF_2$CF($CF_3$)O$CF_2CF_2CF_3$))— are particularly preferred, since the fracture elongation of the fluorinated polymer (a) can thereby be made high.

In a case where the fluorinated polymer (a) is the above copolymer (ii), a preferred range of units (A):units (B):units (C) is from 30 to 75:from 20 to 50:from 5 to 33 (mol %). In a case where the fluorinated polymer (a) is the above copolymer (iii), a preferred range of units (A):units (B):units (D) is from 30 to 70:from 20 to 50:from 1 to 20 (mol %). In a case where the fluorinated polymer (a) is the above copolymer (iv), a preferred range of units (A):units (B):units (C):units (D) is from 30 to 70:from 20 to 50:from 5 to 30:from 1 to 19 (mol %).

(Compound (b))

The compound (b) is a compound having a refractive index higher than the fluorinated polymer (a). The compound (b) is preferably a compound having no C—H bond, since the transmission loss of the optical fiber will thereby be small. Particularly preferred is a compound having a refractive index larger by at least 0.05 than the fluorinated polymer (a) as the matrix.

The compound (b) is preferably a low molecular weight compound, an oligomer or a polymer which contains an aromatic ring, a halogen atom such as chlorine, bromine or iodine, or a linking group such as an ether bond.

The number average molecular weight (the molecular weight in the case of a low molecular weight compound) of the compound (b) is preferably from $3 \times 10^2$ to $2 \times 10^3$, particularly preferably from $3 \times 10^2$ to $1 \times 10^3$. When it is at least the lower limit value in the above range, the glass transition temperature of the inner layer will be high, and the heat resistance will be excellent. When it is at most the upper limit value in the above range, the compatibility of the compound (b) with the fluorinated polymer (a) will be good.

As specific examples of the compound (b), a fluorohalogenated aliphatic compound, a halogenated aromatic hydrocarbon or halogenated polycyclic compound containing no hydrogen atom bonded to a carbon atom, etc. may be mentioned.

The fluorohalogenated aliphatic compound may, for example, be a pentameric to octameric oligomer of chlorotrifluoroethylene, a pentameric to octameric oligomer of dichlorofluoroethylene, or a dimeric to pentameric oligomer obtainable by polymerizing a monomer (e.g. a monomer having a chlorine atom) which gives an oligomer having a high refractive index among monomers to form the fluorinated polymer (a), as disclosed in JP-A-8-5848.

The halogenated aromatic hydrocarbon or halogenated polycyclic compound containing no hydrogen atom bonded to a carbon atom, is preferably a fluorinated aromatic hydrocarbon or fluorinated polycyclic compound containing only fluorine atoms as halogen atoms (or containing fluorine atoms and a relatively small number of chlorine atoms), since the compatibility with the fluorinated polymer (a) will thereby be good. Further, such a halogenated aromatic hydrocarbon or halogenated polycyclic compound more preferably has no functional group with polarity such as a carbonyl group or cyano group.

The halogenated aromatic hydrocarbon may be a compound represented by the formula φr-Zb [wherein φr is a b-valent fluorinated aromatic ring residue having all hydrogen atoms substituted by fluorine atoms, Z is a halogen atom other than fluorine, -Rf, —CO-Rf, —O-Rf or —CN, where Rf is a perfluoroalkyl group, a polyfluoroperhaloalkyl group or a monovalent φr, and b is an integer of at least 0]. As such an aromatic ring, a benzene ring or a naphthalene ring is preferred. Rf is preferably a perfluoroalkyl or polyfluoroperhaloalkyl group having at most 5 carbon atoms. The halogen atom other than a fluorine atom is preferably a chlorine atom or a bromine atom. As specific compounds, 1,3-dibromotetrafluorobenzene, 1,4-dibromotetrafluorobenzene, 2-bromotetrafluorobenzotrifluoride, chloropentafluorobenzene, bromopentafluorobenzene, iodopentafluorobenzene, decafluorobenzophenone, perfluoroacetophenone, perfluorobiphenyl, chloroheptafluoronaphthalene and bromoheptafluoronaphthalene may be mentioned.

As the fluorinated polycyclic compound, compounds of the following formulae (b-1) to (b-3) as exemplified in JP-A-11-167030, are preferred.

(b-1) A compound which is a fluorinated non-condensed polycyclic compound and has no C—H bond, wherein at least two fluorinated rings which are carbon rings or hetero rings and have fluorine atoms or perfluoroalkyl groups, are bonded by a bond containing at least one member selected from the group consisting of a triazine ring, oxygen, sulfur, phosphorus and a metal.

(b-2) A compound which is a fluorinated non-condensed polycyclic compound and has no C—H bond, wherein at least three fluorinated rings which are carbon rings or hetero rings and have fluorine atoms or perfluoroalkyl groups, are bonded directly or by a bond containing carbon.

(b-3) A fluorinated condensed polycyclic compound which is a condensed polycyclic compound constituted by at least three carbon rings or hetero rings and has no C—H bond.

As the compound (b), particularly preferred compounds are chlorotrifluoroethylene oligomer, perfluoro(triphenyltriazine), perfluoro-terphenyl, perfluoro-quaterphenyl, perfluoro(triphenyl benzene), perfluoroanthracene, a compound represented by the formula (30) and a compound represented by the formula (31), since the compatibility with the fluorinated polymer (a) is good, and the heat resistance is good. Since the compatibility is good, the fluorinated polymer (a) and the compound (b) may be mixed at a temperature of from 200 to 300° C. Further, the fluorinated polymer (a) and the compound (b) may be dissolved in a fluorinated solvent and mixed, followed by removing the solvent, so that both may be uniformly mixed.

As the compound (b), one type may be used alone, or at least two types may be used in combination.

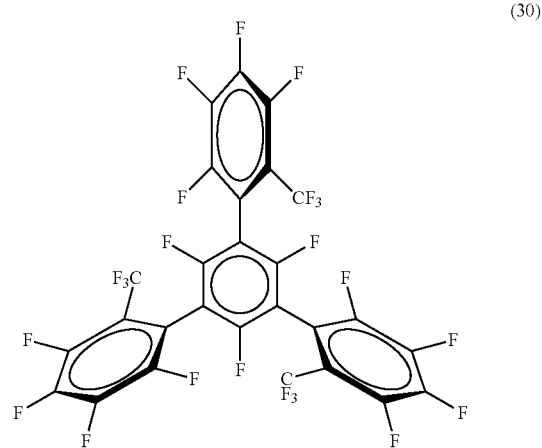

(30)

-continued

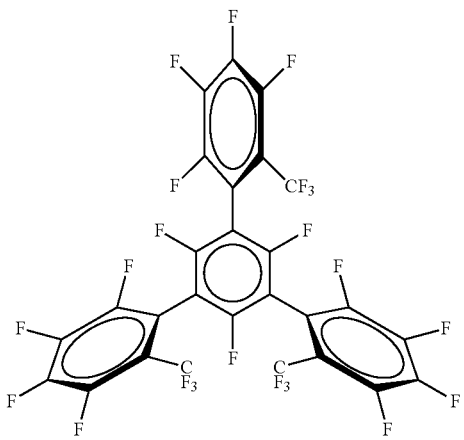
(31)

In order to form an inner layer having the compound (b) distributed in a matrix composed of the fluorinated polymer (a), it is preferred to use a mixture of the fluorinated polymer (a) and the compound (b).

The content of the compound (b) in the mixture of the fluorinated polymer (a) and the compound (b) is preferably from 5 to 25 mass %, particularly preferably from 7 to 15 mass %, to the total amount of the fluorinated polymer (a) and the compound (b). Within such a range, the inner layer of the optical fiber will be excellent in heat resistance.

(Fluorinated Polymer (c))

The fluorinated polymer (c) as the material to form the outer layer is a fluorinated polymer which is amorphous and may have a C—H bond only at a terminal of the main chain.

The outer layer is not a portion where light mainly propagates and therefore may simply reflect light leaked from the inner layer when the optical fiber is bent. Accordingly, even if the fluorinated polymer (c) has a C—H bond only at a terminal of the main chain, no substantial influence will be given to the transmission of near infrared light absorbed by the C—H bond. In a case where the fluorinated polymer (c) has a C—H bond only at a terminal of the main chain, the proportion of hydrogen atoms bonded to carbon atoms in the fluorinated polymer (c) is preferably at most 5 mass %, particularly preferably at most 1 mass %. If it exceeds the upper limit value in the above range, the refractive index of the fluorinated polymer (c) tends to increase, and it tends to be difficult to maintain the prescribed refractive index difference to the inner layer.

The fluorinated polymer (c) is preferably a fluorinated polymer having no C—H bond, since the transmission loss of the optical fiber will thereby be small.

A preferred range of the viscosity in the melted state of the fluorinated polymer (c) is the same as in the case of the fluorinated polymer (a), and a preferred range of the number average molecular weight and a preferred range of the intrinsic viscosity [η] of the fluorinated polymer (c) are also the same as in the case of the fluorinated polymer (a).

The refractive index of the fluorinated polymer (c) is preferably from 1.25 to 1.40, particularly preferably from 1.30 to 1.35. However, it is preferred that the refractive index of the outer layer is lower than the refractive index of the inner layer, and the refractive index of the fluorinated polymer (c) is lower than the refractive index of the fluorinated polymer (a). The refractive index of the fluorinated polymer (c) is preferably lower by at least 0.003, particularly preferably lower by at least 0.005, than the refractive index of the fluorinated polymer (a).

Depending upon the fiber stretching ratio in the optical fiber after the production and the material to form the protective coating layer, the fluorinated polymer (c) is selected so that the fracture elongation of the fluorinated polymer (c) when a tensile test is conducted at the glass transition temperature of the material to form the protective coating layer, would be at least 120% and larger than the fiber stretching ratio.

As the fluorinated polymer (c), a fluorinated polymer having the same aliphatic cyclic structure as the above fluorinated polymer (a) is preferred, a fluorinated polymer having an aliphatic cyclic structure in the main chain is more preferred, and a fluorinated polymer having a fluorinated aliphatic cyclic structure in the main chain is particularly preferred.

As the fluorinated polymer (c), the above-mentioned copolymers (i) to (iv) containing the same units (A) to (D) as the fluorinated polymer (a), or a mixture of at least two of them, is preferred. Among them, the copolymer (ii), the copolymer (iii) and the copolymer (iv) are preferred, since adjustment of the physical properties such as the refractive index, glass transition point, etc. of the polymer is thereby easy.

The fluorinated polymer (c) is preferably a copolymer which contains units (A) and units (B) and further contains one or both of units (C) and units (D).

From the viewpoint of excellent heat resistance, the copolymer (i) containing no units (A) and (D) is preferred.

The refractive index, glass transition temperature (Tgc) and fracture elongation of the fluorinated polymer (c) may be adjusted by the composition (types and contents) of units to constitute the fluorinated polymer (c).

As a method for increasing the fracture elongation of the fluorinated polymer (c), a method of increasing the content proportions of units (C) and/or units (D) may be mentioned. As a method for decreasing the fracture elongation of the fluorinated polymer (c), a method of increasing the content proportion of units (B) may be mentioned.

<Units (A)>

Units (A) contained in the fluorinated polymer (c) are particularly preferably units represented by the following formula (41) or (42), since the transmission loss of the optical fiber is thereby small. In the formula (41) or (42), one of d and e is 0, and the other is 1.

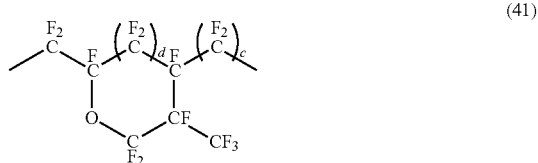
(41)

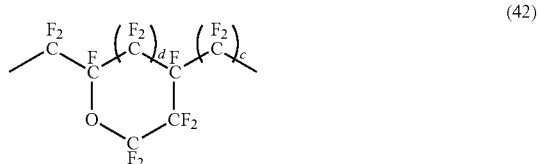
(42)

<Units (B)>

Units (B) contained in the fluorinated polymer (c) are particularly preferably units represented by the following formula (43), since the refractive index can thereby be made small.

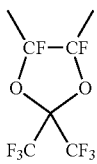

(43)

<Units (C)>
Units (C) contained in the fluorinated polymer (c) are particularly preferably —(CF$_2$—CF$_2$)— or —(CF$_2$—CFCl)—, since the fracture elongation of the fluorinated polymer (c) can thereby be made high.

<Units (D)>
Units (D) contained in the fluorinated polymer (c) are particularly preferably —(CF$_2$—CF(OCF$_3$))—, —(CF$_2$—CF(OC$_3$F$_7$))— or —(CF$_2$—CF(OCF$_2$CF(CF$_3$)OCF$_2$CF$_2$CF$_3$))—, since the fracture elongation of the fluorinated polymer (c) can thereby be made high.

In a case where the fluorinated polymer (c) is the above copolymer (i), a preferred range of units (B):units (C) is from 50 to 95:from 5 to 50 (mol %), and from 60 to 80:from 20 to 40 (mol %) is particularly preferred. When the proportion of units (C) is at least the lower limit value in the above range, the fluorinated polymer (c) will be excellent in fracture elongation, and when it is at most the upper limit value, the outer layer will have a sufficient refractive index difference to the outermost portion of the inner layer. The reason as to why when the proportion of units (C) is at least the lower limit value in the above range, the fluorinated polymer (c) will be excellent in fracture elongation, is such that when units (C) increase, the glass transition temperature of the fluorinated polymer decreases, whereby, when compared at the same temperature, the fluidity of the polymer increases, and consequently, the fracture elongation tends to be large. The reason as to why when the proportion of units (C) is at most the upper limit value, the outer layer will have a sufficient refractive index difference to the outermost portion of the inner layer, is such that if units (B) increase, the refractive index tends to decrease, and therefore, by limiting units (C) to the above upper limit value, it is possible to obtain the refractive index difference between the inner layer and the outer layer, which is required to trap light in the inner layer.

In a case where the fluorinated polymer (c) is the above copolymer (ii), a preferred range of units (A):units (B):units (C) is from 30 to 75:from 20 to 50:from 5 to 33 (mol %), and from 30 to 65:from 25 to 45:from 10 to 30 (mol %) is particularly preferred. When the proportion of units (C) is at least the lower limit value in the above range, the fluorinated polymer (c) will be excellent in fracture elongation, and when it is at most the upper limit value, the outer layer tends to readily have a glass transition temperature higher than the inner layer. When the proportion of units (B) is at least the lower limit value in the above range, the outer later will have a sufficient refractive index difference to the outermost portion of the inner layer, and when it is at most the upper limit value, the fluorinated polymer (c) will be excellent in fracture elongation.

In a case where the fluorinated polymer (c) is the above copolymer (iii), a preferred range of units (A):units (B):units (D) is from 30 to 70:from 20 to 50:from 1 to 20 (mol %), and from 50 to 70:from 25 to 35:from 5 to 15 (mol %) is particularly preferred. Here, the rest after deducting units (B)+(D) from 100 mol %, becomes a preferred range of units (A). When the proportion of units (D) is at least the lower limit value in the above range, the fluorinated polymer (c) will be excellent in fracture elongation, and when it is at most the upper limit value, the outer layer tends to readily have a glass transition temperature higher than the inner layer. When the proportion of units (B) is at least the lower limit value in the above range, the outer layer will have a sufficient refractive index difference to the outermost portion of the inner layer, and when it is at most the upper limit value, the fluorinated polymer (c) will be excellent in fracture elongation.

In a case where the fluorinated polymer (c) is the above copolymer (iv), a preferred range of units (A):units (B):units (C):units (D) is from 30 to 70:from 20 to 50:from 5 to 30:from 1 to 19 (mol %), and from 40 to 60: from 25 to 40:from 10 to 25:from 2 to 10 (mol %) is particularly preferred. Here, units (B) are at least 20 mol %, and the rest after deducting units (B)+(C)+(D) from 100 mol %, becomes a preferred range of units (A). When the proportion of units (C) is at least the lower limit value in the above range, the fluorinated polymer (c) will be excellent in fracture elongation, and when it is at most the upper limit value, the outer layer tends to readily have a glass transition temperature higher than the inner layer. When the proportion of units (B) is at least the lower limit value in the above range, the outer layer will have a sufficient refractive index difference to the outermost portion of the inner layer, and when it is at most the upper limit value, the fluorinated polymer (c) will be excellent in fracture elongation.

In the present invention, as a combination of the fluorinated polymer (a) and the fluorinated polymer (c), preferred is a combination such that the fluorinated polymer (a) is a homopolymer composed of units (A), and the fluorinated polymer (c) is at least one member selected from the copolymers (i) to (iv), and particularly preferred is a combination such that the fluorinated polymer (a) is a homopolymer composed of units (A), and the fluorinated polymer (c) is at least one member selected from the copolymers (ii) to (iv). As the units (A), units represented by the above formula (42) are preferred.

From the viewpoint of excellent heat resistance, either one of the following combinations (V) and (VI) is preferred.

(V) A combination wherein the fluorinated polymer (a) is a homopolymer composed of units of the formula (41), and the fluorinated polymer (c) is at least one member selected from the copolymers (i) to (iv), particularly preferably a combination wherein the fluorinated polymer (a) is a homopolymer composed of units of the formula (41), and the fluorinated polymer (c) is the copolymer (i).

(VI) A combination wherein the fluorinated polymer (a) is at least one member selected from the copolymers (i) to (iv), and the fluorinated polymer (c) is at least one member selected from the copolymers (i) to (iv), particularly preferably a combination wherein the fluorinated polymer (a) is at least one member selected from the copolymers (ii) to (iii), and the fluorinated polymer (c) is the copolymer (i).

(Protective Coating Layer)

The protective coating layer is formed in at least one layer on the outer layer of the optical fiber bare wire.

The glass transition temperature Tg (° C.) of the material to form the protective coating layer should better be high from the viewpoint of excellent heat resistance. Especially when fluorinated polymers (a) and (c) having high glass transition temperatures are to be used, if the glass transition temperature of the protective coating layer is too low, it is likely that the fluorinated polymers (a) and (c) can hardly secure sufficient fracture elongation. Accordingly, the glass transition temperature of the protective coating layer should better be high in order to secure sufficient fracture elongation for the fluorinated polymers (a) and (c) having high glass transition temperatures and from the viewpoint of excellent heat resistance.

The glass transition temperature Tg (° C.) of the material to form the protective coating layer is preferably from 100 to 150° C. When the glass transition temperature Tg is at least the lower limit value in the above range, the heat and humidity durability of the protective coating layer will be good, and when it is at most the upper limit value, fiber-forming will be easy.

The material to form the protective coating layer is not particularly limited so long as it is a synthetic resin, and thermoplastic resins other than the fluorinated polymers (a) and (c), cured product of curable resins, etc. may be used. Among them, an acrylic resin such as polymethyl methacrylate (PMMA), an aromatic polycarbonate, a cyclic olefin polymer, a polymer alloy of an aromatic polycarbonate and an aromatic polyester, or a polymer alloy of a polyphenylene ether and a general-purpose polystyrene (GPPS) or impact resistant polystyrene, is preferred. Such a polymer alloy may be produced by melt-kneading by means of a double screw extruder.

As the acrylic resin, a commercial product may be used, and PMMA (Parapet EH1000, manufactured by Kuraray Co., Ltd., glass transition temperature: 100° C.) may, for example, be mentioned.

As the aromatic polycarbonate to be used for the polymer alloy of an aromatic polycarbonate and an aromatic polyester, an aromatic polycarbonate produced by the after-mentioned reaction of a dihydric phenol with a carbonate precursor may be used. For example, it is possible to use one produced by a solution method or a melt method of reacting a dihydric phenol with a carbonate precursor, specifically by a reaction of a dihydric phenol with phosgene, or by an ester exchange reaction of a dihydric phenol with a diphenyl carbonate or the like.

The dihydric phenol may, for example, be 2,2-bis(4-hydroxyphenyl)propane (bisphenol A), bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, a bis(4-hydroxyphenyl)cycloalkane, bis(4-hydroxyphenyl)sulfide, bis(4-hydroxyphenyl)sulfone, bis(4-hydroxyphenyl)sulfoxide, bis(4-hydroxyphenyl)ether or bis(4-hydroxyphenyl)ketone. Among them, a compound using, as the main material, a bis(hydroxyphenyl)alkane type, particularly bisphenol A, is preferred from the viewpoint of availability and costs.

The carbonate precursor may, for example, be phosgene or diphenyl carbonate.

As the aromatic polycarbonate, a commercial product may be used. Commercial products may, for example, be Panlite L-1225LM, Panlite L-1225L, Panlite L-1225Y, Panlite L-1250Y (each manufactured by Teijin Kasei), Tarflon AC1080, Tarflon AC1030, Tarflon 1900, Tarflon R1900 (each manufactured by Idemitsu Kosan Co., Ltd.), LEXAN 915R, LEXAN 925A (each manufactured by SABIC Innovative Japan), etc.

The aromatic polyester comprises a carboxylic acid and a diol as constituting components, and it is preferred that the carboxylic acid as a constituting component of the aromatic polyester is phthalic acid.

The diol as a constituting component of the aromatic polyester preferably contains at least two types of diols. Specifically, it preferably contains at least one diol selected from the group consisting of bisphenol fluorene, biscresol fluorene, bisphenoxyethanol fluorene, cyclohexane dimethanol and spiro glycol, and at least one diol selected from the group consisting of ethylene glycol and butylene glycol.

If the diol component is other than as described above, it is likely that the aromatic polyester tends to be crystalline, thus leading to a problem in processability.

As the aromatic polyester, a commercial product may be used. Commercial products may, for example, be EASTER PCTG 10179, EASTER Copolyester 5445, EASTER Copolyester 6763, EASTER Copolyester 15086 (each manufactured by Eastman Chemical), OKP4, OKP6, OKP4HT (each manufactured by Osaka Gas Chemical), Altester 20, Altester 30, Altester 45 (each manufactured by Mitsubishi Gas Chemical), etc.

As the polymer alloy of an aromatic polycarbonate and an aromatic polyester, a commercial product may be used, and XYLEX X7300CL (manufactured by SABIC Innovative Japan, glass transition temperature: 113° C.) may, for example, be mentioned. XYLEX X7300CL is a polymer alloy of an aromatic polycarbonate (PC) and an aromatic polyester (PE) (the dicarboxylic acid is cyclohexane dicarboxylic acid, and the diol is cyclohexane dimethanol), wherein the mass ratio of PC:PE is 60:40.

In the polymer alloy of a polyphenylene ether and a general-purpose polystyrene (GPPS) or impact resistant polystyrene, the general-purpose polystyrene is one wherein the resin component excluding additives is composed substantially solely of a polymer of a styrene type monomer. On the other hand, the impact resistant polystyrene may, for example, be a copolymer of a styrene type monomer with a monomer giving a rubber component such as butadiene, or a blend resin of such a copolymer and other homopolymer or copolymer.

The polyphenylene ether may, for example, be poly(2,6-dimethyl-1,4-phenylene)ether, poly(2-methyl-6-ethyl-1,4-phenylene) ether, poly(2,6-diethyl-1,4-phenylene)ether, poly(2-methyl-6-n-propyl-1,4-phenylene)ether, poly(2-ethyl-6-n-propyl-1,4-phenylene)ether, poly(2,6-di-n-propyl-1,4-diphenylene)ether, poly(2-methyl-6-i-propyl-1,4-phenylene)ether, poly(2-ethyl-6-i-propyl-1,4-phenylene)ether, poly(2,6-di-i-propyl-1,4-phenylene)ether, poly(2-methyl-6-phenyl-1,4-phenylene)ether, poly(2,6-diphenyl-1,4-phenylene)ether, poly(2-methyl-6-chloro-1,4-phenylene)ether, poly(2-methyl-6-hydroxyethyl-1,4-phenylene)ether, poly(2-methyl-6-chloroethyl-1,4-phenylene)ether, poly(2-methyl-6-methoxy-1,4-phenylene)ether, poly(2-methyl-1,4-phenylene)ether, poly(-1,4-phenylene)ether, or poly(2,6-di(p-fluorophenyl)-1,4-phenylene)ether.

As the polymer alloy of a polyphenylene ether and a general-purpose polystyrene or impact resistant polystyrene, a commercial product may be used. Commercial products may, for example, be Zylon T0702, Zylon X304H (each manufactured by Asahi Kasei Chemicals), etc.

The material to form the protective coating layer may contain various additives as the case requires. For example, a flame retardant, an antioxidant, a radical scavenger, etc. may be mentioned.

The protective coating layer may be formed in at least two layers. When two layers are to be formed, it is preferred that the inside protective coating layer to cover the outer periphery of the optical fiber bare wire is formed by using a material to impart mechanical strength to the optical fiber, and the outside protective coating layer to cover its outer periphery is formed by using a material having various additives incorporated to impart functions such as flame retardance, etc.

The protective coating layer is provided for the purpose of increasing the mechanical strength of the optical fiber bare wire. Accordingly, the protective coating layer is required to have at least a certain thickness. Specifically, the thickness of the protective coating layer is preferably at least 0.5 time, particularly preferably at least 0.8 time, the radius of the optical fiber bare wire. From the viewpoint of e.g. the flexibility of the optical fiber, the upper limit is preferably at most 30 times, particularly preferably at most 15 times, the radius of the fiber bare wire.

(Preferred Combination of Materials)

As materials to form the plastic optical fiber of the present invention, the following combinations are preferred.

As the material to form the inner layer and the material to form the outer layer, the following combinations (a) to (y) are available as combinations to make Tgc higher than Tga.

(α) Material to form the inner layer: In a matrix composed of the fluorinated polymer (a), the compound (b) having a refractive index higher than the fluorinated polymer (a) is contained, and a gradient index structure is formed by distribution of the compound (b). The fluorinated polymer (a) is a polymer having only units (units represented by the formula (42)) formed by cyclopolymerization of a fluorinated monomer having at least two polymerizable double bonds.

Material to form the outer layer: Composed solely of the fluorinated polymer (c). The fluorinated polymer (c) is a copolymer comprising the above units (A), units (B) and units (C) in a ratio of the units (A):(B):(C) being from 30 to 75:from 20 to 50:from 5 to 33 (mol %), a copolymer comprising the above units (A), units (B) and units (D) in a ratio of the units (A):(B):(D) being from 30 to 70:from 20 to 50:from 1 to 20 (mol %), or a copolymer comprising the above units (A), units (B), units (C) and units (D) in a ratio of the units (A):(B):(C):(D) being from 30 to 70:from 20 to 50:from 5 to 30: from 1 to 19 (mol %).

Material to form the protective coating layer: An acrylic resin, an aromatic polycarbonate, a cyclic olefin polymer, a polymer alloy of an aromatic polycarbonate and an aromatic polyester, or a polymer alloy of a polyphenylene ether and a general-purpose polystyrene (GPPS) or impact resistant polystyrene.

(β) Material to form the inner layer: In a matrix composed of the fluorinated polymer (a), the compound (b) having a refractive index higher than the fluorinated polymer (a) is contained, and a gradient index structure is formed by distribution of the compound (b). The fluorinated polymer (a) is a polymer having only units (41).

Material to form the outer layer: Composed solely of the fluorinated polymer (c). The fluorinated polymer (c) is a copolymer comprising the above units (B) and units (C), and a preferred range of the units (B):(C) is from 50 to 95:from 5 to 50 (mol %), and a more preferred range is from 60 to 80:from 20 to 40 (mol %).

Material to form the protective coating layer: An acrylic resin, an aromatic polycarbonate, a cyclic olefin polymer, a polymer alloy of an aromatic polycarbonate and an aromatic polyester, or a polymer alloy of a polyphenylene ether and a general-purpose polystyrene (GPPS) or impact resistant polystyrene.

(γ) Material to form the inner layer: In a matrix composed of the fluorinated polymer (a), the compound (b) having a refractive index higher than the fluorinated polymer (a) is contained, and a gradient index structure is formed by distribution of the compound (b). The fluorinated polymer (a) is a copolymer comprising the above units (A), units (B) and units (C) in a ratio of the units (A):(B):(C) being from 30 to 75:from 20 to 50:from 5 to 33 (mol %), or a copolymer comprising the above units (A), units (B) and units (D) in a ratio of the units (A):(B):(D) being from 30 to 70:from 20 to 50:from 1 to 20 (mol %). More preferably, it is a copolymer comprising the above units (A), units (B) and units (C) in a ratio of the units (A):(B):(C) being from 30 to 65:from 25 to 45:from 10 to 30 (mol %), or a copolymer comprising the above units (A), units (B) and units (D) in a ratio of the units (A):(B):(D) being from 30 to 65:from 25 to 40:from 1 to 15 (mol %).

Material to form the outer layer: Composed solely of the fluorinated polymer (c). The fluorinated polymer (c) is a copolymer comprising the above units (B) and units (C), and a preferred range of the units (B):(C) is from 50 to 95:from 5 to 50 (mol %), and a more preferred range is from 60 to 80:from 20 to 40 (mol %).

Material to form the protective coating layer: An acrylic resin, an aromatic polycarbonate, a cyclic olefin polymer, a polymer alloy of an aromatic polycarbonate and an aromatic polyester, or a polymer alloy of a polyphenylene ether and a general-purpose polystyrene (GPPS) or impact resistant polystyrene.

[Method for Producing Plastic Optical Fiber]

The plastic optical fiber of the present invention is produced via a step of stretching, and may be produced by using a known method for producing a plastic optical fiber.

The plastic optical fiber of the present invention is preferably produced by spinning, while stretching in an axial direction, a multi-layer structure wherein the fluorinated polymer (a) is disposed at its center, and a layer of the fluorinated polymer (c) and a layer of the material to form the protective coating layer are disposed concentrically in a radial direction from the center. As such a production method, a method of spinning by heating the multi-layer structure, or a method of spinning while conducting extrusion molding, may, for example, be mentioned.

In a case where the multi-layer structure is a solid cylindrical body made of the above materials, it is possible to heat and soften the solid cylindrical body and spin while stretching the softened portion in the axial direction of the cylindrical body. As the solid cylindrical body, a well-fitted combined body as described later, is preferred.

Further, while producing, by extrusion molding, the above multi-layer structure made of the melted materials, it is possible to spin, while stretching in an axial direction, the forward end portion of the extruded multi-layer structure. The extrusion molding is preferably a method (co-extrusion method) of molding by simultaneously extruding the respective melted materials to form the above multi-layer structure.

An example of the stretching conditions for an optical fiber is disclosed in JP-A-2001-124938.

Usually, in order to well increase the mechanical strength of an optical fiber, the fiber stretching ratio is adjusted to be at least 120%, preferably at least 130%. The upper limit for such a fiber stretching ratio is not particularly limited, but is preferably at most 300%, particularly preferably at most 200%, since the residual stress will not be too large, and fracture of the fiber can be reduced.

The stretching ratio is such that the ratio of the length (L2) after stretching to the length (L1) before stretching is represented by percentage, and is represented by the following formula (I). In a case where an optical fiber is produced via plural stretching steps, the percentage of the ratio of the length (L2) after the last stretching step to the length (L1) before the first stretching step is taken as the stretching ratio.

$$\text{Fiber stretching ratio (unit: \%)} = L2/L1 \times 100 \qquad \text{(I)}$$

The fiber stretching ratio is a value such that the residual stress before and after stretching is evaluated based on the length of the fiber. It is likewise measurable also from the shrinkage of the fiber, when the fiber after stretching is subjected to stress relaxation by a method of heat-treating it at a temperature higher by from 5 to 100° C. than the glass transition temperature of the material to form the protective coating layer. In the present invention, it is a value standardized by the stretching ratio obtainable from the formula (I).

Now, embodiments of the method for producing an optical fiber will be described, but it should be understood that the present invention is by no means thereby restricted.

The first embodiment wherein an optical fiber is produced by a method of spinning by heating a well-fitted combined body, will be described with reference to FIG. 5.

Firstly, the fluorinated polymer (a) and the compound (b) are melt-mixed, and the mixture is cylindrically molded to obtain a molded body a. Separately, a cylindrical tube composed solely of the fluorinated polymer (a) is produced by rotational molding. Then, into the hollow portion of the cylindrical tube, the molded body a is inserted. By further heating, the molded body a and the cylindrical tube are integrated and at the same time, the compound (b) is permitted to thermally diffuse into a matrix composed of the fluorinated polymer (a), to obtain a cylindrical body a. Here, instead of permitting the compound (b) to thermally diffuse at the stage of integrating the molded body a and the cylindrical tube, it may be permitted to thermally diffuse during stretching under the after-described heating conditions to obtain an optical fiber having a refractive index distribution.

Then, using the fluorinated polymer (c), a cylinder having an inside diameter larger than the outside diameter of the cylindrical body a to form the inner layer is produced, and into the hollow portion of the cylinder, the cylindrical body a to form the inner layer is inserted and fitted to obtain a preform.

Then, using a material for the protective coating layer, a coating cylinder having an inside diameter larger than the outside diameter of the preform is produced, and into inside of this cylinder, the preform is inserted and fitted to obtain a well-fitted combined body (symbol 26 in the Fig.).

By heating and spinning the well-fitted combined body 26, a gradient index plastic optical fiber is obtainable.

That is, as the combined body 26 is heated in a heating furnace 11, the lower portion of the combined body 26 is melted. The heating temperature is preferably from 150 to 300° C., more preferably from 180 to 260° C., particularly preferably from 190 to 240° C. Fiber drawing (spinning) is conducted by taking as a starting point the fore-end of the melted lower portion of the combined body 26. With respect to an optical fiber thus obtained, the outside diameter of the spun yarn is monitored by a wire diameter monitor 16. The outside diameter of the optical fiber can be adjusted by adjusting the position of the combined body 26 in the heating furnace 11, the temperature of the heating furnace, the drawing speed of the drawing device 13, etc.

Then, by rewinding by a rewinder 21 via a stretching apparatus 18 and an annealing apparatus 20, a plastic optical fiber having a predetermined stretching ratio imparted is obtained. Here, the stretching ratio is obtained from a ratio of the rewinding speed of the rewinder 21 to the drawing speed of the drawing device 13.

Further, in this embodiment, stretching may be conducted also at the time of fiber drawing. In such a case, as exemplified e.g. in JP-A-7-234322, if the drawing speed is increased, the fiber stretching ratio tends to be large together with the drawing tension, and if the drawing speed is decreased, the fiber stretching ratio tends to be small.

The second embodiment wherein an optical fiber is produced by a co-extrusion method, will be described.

By means of a multi-layer extruder having a diffusion portion as exemplified e.g. in JP-A-2000-356716 and JP-A-8-334634, a material having the fluorinated polymer (a) and the compound (b) melt-mixed, a material composed solely of the fluorinated polymer (a) and a material composed solely of the fluorinated polymer (c) were concentrically extruded by a co-extrusion molding head, and drawn to produce a gradient index plastic optical fiber.

The outside diameter of the obtained optical fiber is monitored by a wire diameter monitor. The outside diameter of the optical fiber may be adjusted by adjusting the melting temperature in the die, the drawing speed of the drawing device, the rewinding speed of the rewinder, etc. Also here, a predetermined stretching ratio may be imparted to the plastic optical fiber by means of the same devices as the drawing device 13, the stretching apparatus 18, the annealing apparatus 20 and the rewinder 21 as shown in FIG. 5.

Further, in this embodiment, stretching may be conducted also at the time of fiber drawing. In such a case, for example, if the die temperature is made low, the fiber stretching ratio tends to be large, and if the die temperature is made high, the fiber stretching ratio tends to be small. If the die diameter is made small, the fiber stretching ratio tends to be large, and if the die diameter is made large, the fiber stretching ratio tends to be small. If the drawing speed is increased, the fiber stretching ratio tends to be large, and if the drawing speed is decreased, the fiber stretching ratio tends to be small. Further, by conducting stretching by means of a stretching apparatus also before rewinding, the mechanical properties may be improved.

According to the present invention, it is possible to obtain a plastic optical fiber whereby the transmission loss and the bending loss are small, as shown by the following Examples. For example, it is possible to obtain an optical fiber whereby the transmission loss at a wavelength of 850 nm is at most 200 dB/km, preferably at most 100 dB/km, and the bending loss (bending radius: 5 mm) is at most 1 dB, preferably at most 0.5 dB.

EXAMPLES

Now, the present invention will be described in further detail with reference to Examples, but it should be understood that the present invention is by no means restricted by these Examples. Here, Examples 1 to 3, 5 to 8 and 13 to 16 are Working Examples of the present invention, and Examples 4 and 9 to 12 are Comparative Examples.

[Evaluation of Polymer]
(Glass Transition Temperature)

Measured by means of a differential scanning calorimeter DSC Q100 (product name) manufactured by TA Instruments.
(Refractive Index)

Measured in accordance with JIS K7142 by means of Abbe refractometer 2T (product name) manufactured by Atago Co., Ltd.
(Intrinsic Viscosity [η])

Measured in accordance with JIS K7367-1 under the following conditions by means of an Ubbelohde-type viscometer manufactured by Sibata Scientific Technology Ltd.

Temperature for measurement: 30° C. (constant temperature vessel)

Solvent for dilution: perfluoro(2-butyltetrahydrofuran)

Dilute concentration: 1%, 0.67%, 0.59%

[Material to Form Outer Layer]

Synthesis Example 1

Synthesis of Polymer (c-1)

Into a stainless steel autoclave having an inner volume of 2 L, 1,030 g of perfluoro(butenyl vinyl ether) ($CF_2$=$CFOCF_2CF_2CF$=$CF_2$, hereinafter referred to also as "BVE") as a monomer to form units (A), 110 g of perfluoro (2,2-dimethyl-1,3-dioxole) (hereinafter referred to also as "PDD") as a monomer to form units (B), 154 g of perfluoro (propyl vinyl ether) (hereinafter referred to also as "PPVE") as a monomer to form units (D), 1,360 g of tridecafluorohexane (hereinafter referred to also as "C6H") as a solvent, and 41 g of a HCFC225cb (chemical formula: $CClF_2CF_2CHClF$) solution of perfluorobutyryl peroxide (hereinafter referred to also as "PFB") as a polymerization initiator (PFB concentration: 2.5 mass %), were put. Inside of the system was freeze-deaerated, and then, solution polymerization was conducted at 20° C. for 40 hours to obtain 230 g of polymer (c-1). Polymer (c-1) was a transparent glassy polymer being strong at room temperature.

The composition ratios (unit: mol %) of units (A) formed from BVE, units (B) formed from PDD and units (D) formed from PPVE were calculated by an analysis of F-NMR. Further, the glass transition temperature and the refractive index of polymer (c-1) were measured, and the results are shown in Table 1.

Synthesis Examples 2 and 3

Synthesis of Polymer (c-2) and Polymer (c-3))

Polymer (c-2) and polymer (c-3) were synthesized in the same manner as in Synthesis Example 1 except that the charged ratios of the monomers were changed, and their physical properties were measured. The results are shown in Table 1.

Synthesis Example 4

Synthesis of Polymer (c-4)

Into a stainless steel autoclave having an inner volume of 2 L, 920 g of BVE, 188 g of PDD, 381 g of PPVE, no solvent, and 27 g of a HCFC225cb solution of PFB (PFB concentration: 2.5 mass %) were put. Inside of the system was freeze-deaerated, and then, solution polymerization was conducted at 40° C. for 5.5 hours to obtain 240 g of polymer (c-4). The physical properties were measured, and the results are shown in Table 1.

Synthesis Example 5

Synthesis of Polymer (c-5)

Into a stainless steel autoclave having an inner volume of 2 L, 1,000 g of BVE, 174 g of PDD, 53 g of tetrafluoroethylene (hereinafter referred to also as "TFE") as a monomer to form units (C), 1,250 g of C6H, 0.24 g of cyclohexane as a chain transfer agent, and 41 g of a HCFC225cb solution of PFB (PFB concentration: 2.5 mass %) were put. Inside of the system was freeze-deaerated, and then, solution polymerization was conducted at 40° C. for 5.5 hours to obtain 260 g of polymer (c-5). The physical properties were measured, and the results are shown in Table 1.

Synthesis Example 6

Synthesis of Polymer (c-6)

Into a stainless steel autoclave having an inner volume of 200 mL, 15 g of BVE, 8.5 g of PDD, 4.5 g of TFE, 100 g of ion-exchanged water, 17 g of methanol, and 0.28 g of diisopropylperoxy dicarbonate were put. Inside of the system was replaced three times with nitrogen, and then, suspension polymerization was conducted at 40° C. for 22 hours to obtain 27 g of polymer (c-6). The physical properties were measured, and the results are shown in Table 1.

Synthesis Example 7

Synthesis of Polymer (c-7)

Polymer (c-7) was synthesized in the same manner as in Synthesis Example 6 except that the charged ratios of the monomers were changed, and the physical properties were measured. The results are shown in Table 1.

Synthesis Example 8

Synthesis of Polymer (c-8)

Into a stainless steel autoclave having an inner volume of 2 L, 1,180 g of BVE, 200 g of PDD, 15 g of PPVE, 38 g of TFE, 1,250 g of C6H, and 41 g of a HCFC225cb solution of PFB (PFB concentration: 2.5 mass %) were put. Inside of the system was freeze-deaerated, and then, solution polymerization was conducted at 40° C. for 5.5 hours to obtain 300 g of polymer (c-8). The physical properties were measured, and the results are shown in Table 1.

Synthesis Example 9

Synthesis of Polymer (c-9)

Into a stainless steel autoclave having an inner volume of 2 L, 104 g of BVE, 110 g of PDD, 1,280 g of C6H, and 41 g of a HCFC225cb solution of PFB (PFB concentration: 2.5 mass %) were put. Inside of the system was freeze-deaerated, and then, solution polymerization was conducted at 40° C. for 5.5 hours to obtain 240 g of polymer (c-9). The physical properties were measured, and the results are shown in Table 1.

Synthesis Example 10

Synthesis of Polymer (c-10)

Polymer (c-10) was obtained in accordance with the disclosure in an Example in JP-A-11-228638. The physical properties were measured, and the results are shown in Table 1.

TABLE 1

| | | Composition ratios of units in polymer | | | | | |
|---|---|---|---|---|---|---|---|
| | | Units (A) BVE | Units (B) PDD | Units (C) TFE | Units (D) PPVE | Physical properties of polymer | |
| Synthesis Ex. | Polymer | units [mol %] | units [mol %] | units [mol %] | units [mol %] | Glass transition temperature [° C.] | Refractive index |
| 1 | (c-1) | 60 | 33 | 0 | 7 | 131 | 1.328 |
| 2 | (c-2) | 65 | 32 | 0 | 3 | 130 | 1.329 |

TABLE 1-continued

| | | Composition ratios of units in polymer | | | | Physical properties of polymer | |
| | | Units (A) BVE | Units (B) PDD | Units (C) TFE | Units (D) PPVE | | |
| Synthesis Ex. | Polymer | units [mol %] | units [mol %] | units [mol %] | units [mol %] | Glass transition temperature [° C.] | Refractive index |
|---|---|---|---|---|---|---|---|
| 3 | (c-3) | 44 | 44 | 0 | 13 | 133 | 1.322 |
| 4 | (c-4) | 64 | 26 | 0 | 10 | 125 | 1.329 |
| 5 | (c-5) | 58 | 28 | 13 | 0 | 128 | 1.330 |
| 6 | (c-6) | 27 | 38 | 35 | 0 | 104 | 1.328 |
| 7 | (c-7) | 32 | 42 | 26 | 0 | 129 | 1.323 |
| 8 | (c-8) | 50 | 30 | 15 | 5 | 123 | 1.328 |
| 9 | (c-9) | 72 | 28 | 0 | 0 | 135 | 1.331 |
| 10 | (c-10) | 0 | 72 | 28 | 0 | 160 | 1.310 |

[Material to Form Inner Layer]

Synthesis Example 11

Synthesis of Polymer (a-1)

Into a glass flask having an inner volume of 5 L, 750 g of BVE as a monomer to form units (A), 4 kg of ion-exchanged water, 260 g of methanol and 3.7 g of diisopropylperoxy dicarbonate were put. Inside of the system was replaced with nitrogen, and then, suspension polymerization was conducted at 40° C. for 22 hours to obtain 690 g of a polymer having a number average molecular weight of about $5 \times 10^4$. The polymer was heated at 250° C. for 5 hours in an atmosphere of fluorine/nitrogen mixed gas (fluorine gas concentration: 20 vol %) to obtain polymer (a-1).

The glass transition temperature and the refractive index of polymer (a-1) are shown in Table 2. The intrinsic viscosity [q] was 0.3 at 30° C. in PBTHF, and it was a transparent glassy polymer being strong at room temperature.

Production Example 1

Production of Material (a-1) to form Inner Layer, and Cylindrical Body (a-1)

To 100 parts by mass of polymer (a-1), 8.8 parts by mass of the above compound represented by the formula (30) (refractive index: 1.41) and 2.2 parts by mass of the compound represented by the formula (31) (refractive index: 1.46) were added, as compound (b), and mixed to obtain material (a-1) to form an inner layer.

The obtained material (a-1) was charged into a sealed glass tube and melt-molded at 250° C. to obtain cylindrical molded body (a-1). The outside diameter of the molded body (a-1) was 15 mm, the glass transition temperature was 92° C., and the refractive index was 1.354.

Then, a cylindrical tube composed solely of polymer (a-1) was produced by melt-molding, and into the hollow portion of the cylindrical tube, the molded body (a-1) was inserted and heated at 200° C. for integration to produce cylindrical body (a-1) to form an inner layer. The outside diameter of the cylindrical body (a-1) was 20 mm.

Production Example 2

Production of Material (a-2) to form Inner Layer, and Cylindrical Body (a-2)

Material (a-2) to form an inner layer was obtained in the same manner as in Production Example 1 except that, as compound (b), 15 parts by mass of a chlorotrifluoroethylene oligomer (average molecular weight: 760, refractive index: 1.41) was used.

Using the obtained material (a-2), cylindrical body (a-2) was obtained in the same manner as in Production Example 1.

Production Example 3

Production of Material (a-3) to form Inner Layer, and Cylindrical Body (a-3)

Material (a-3) to form an inner layer was obtained in the same manner as in Production Example 1 except that, as compound (b), 7 parts by mass of perfluoro(1,3,5-triphenylbenzene (refractive index: 1.47) was used.

Using the obtained material (a-3), cylindrical body (a-3) was obtained in the same manner as in Production Example 1.

Synthesis Example 12

Synthesis of Polymer (a-4)

Into a pressure resistant glass autoclave having an inner volume of 200 mL, 215 g of $CF_2=CFCF_2CF(CF_3)OCF=CF$, hereinafter referred to also as "MBVE") as a monomer to form units (A), 80 g of ion-exchanged water, 2.4 g of methanol, and 38 mg of perfluorobenzoyl peroxide, were put. Inside of the system was replaced with nitrogen, then, heated until the inside temperature of the autoclave became 70° C., and polymerization was carried out at 70° C. for 20 hours. The obtained polymer was washed with ion-exchanged water and methanol and then dried at 200° C. for 1 hour to obtain 12.5 g of the polymer. The polymer was heated at 250° C. for 5 hours in an atmosphere of fluorine/nitrogen gas (fluorine gas concentration: 20 vol %) to obtain polymer (a-4).

The glass transition temperature and the refractive index of polymer (a-4) are shown in Table 2. The zero-shear viscosity at 230° C. was measured by a rotary melt viscoelasticity measuring apparatus and found to be 200 Pa·s, and it was a transparent glassy polymer being strong at room temperature.

Production Example 4

Production of Material (a-4) to form Inner Layer, and Cylindrical Body (a-4)

Material (a-4) to form an inner layer was obtained in the same manner as in Production Example 1 except that polymer (a-4) was used instead of polymer (a-1), and by using such material, cylindrical body (a-4) was obtained.

Synthesis Example 13

Synthesis of Polymer (a-5))

Polymer (c-4) obtained in Synthesis Example 4 was heated at 250° C. for 5 hours in an atmosphere of fluorine/nitrogen gas (fluorine gas concentration: 20 vol %) to obtain polymer (a-5). The glass transition temperature and the refractive index of polymer (a-5) are shown in Table 2.

Production Example 5

Production of Material (a-5) to form Inner Layer, and Cylindrical Body (a-5)

Material (a-5) to form an inner layer was obtained in the same manner as in Production Example 1 except that polymer (a-5) was used instead of polymer (a-1), and by using such material, cylindrical body (a-5) was obtained.

Synthesis Example 14

Synthesis of Polymer (a-6))

Polymer (c-5) obtained in Synthesis Example 5 was heated at 250° C. for 5 hours in an atmosphere of fluorine/nitrogen gas (fluorine gas concentration: 20 vol %) to obtain polymer (a-6). The glass transition temperature and the refractive index of polymer (a-6) are shown in Table 2.

Production Example 6

Production of Material (a-6) to form Inner Layer, and Cylindrical body (a-6)

Material (a-6) to form an inner layer was obtained in the same manner as in Production Example 1 except that polymer (a-6) was used instead of polymer (a-1), and by using such material, cylindrical body (a-6) was obtained.

the refractive index (1.330) of polymer (a-6), contained in the material to form an inner layer.

The glass transition temperatures of polymers (c-1) to (c-5) and (c-7) to (c-9) obtained in Synthesis Examples 1 to 5 and 7 to 9 were higher than the glass transition temperature (108° C.) of polymer (a-1) contained in the material to form an inner layer.

The glass transition temperature of polymer (c-10) obtained in Synthesis Example 10 was higher than the glass transition temperature (124° C.) of polymer (a-4), the glass transition temperature (125° C.) of polymer (a-5) or the glass transition temperature (128° C.) of polymer (a-6), contained in the material to form an inner layer.

On the other hand, the glass transition temperature of polymer (c-6) obtained in Synthesis Example 6 was lower than the glass transition temperature of polymer (a-1). This is considered to be attributable to that the proportion of units (C) in polymer (c-6) was high.

[Material to Form Protective Coating Layer]

Synthesis Example 15

Synthesis of Polymer (d-1) to Form Protective Coating Layer

As material (d-1) to form a protective coating layer, a polymer alloy was obtained by melt-kneading at 270° C. 6 parts by mass of polyphenylene ether (PPE) and 94 parts by mass of general-purpose polystyrene (GPPS). The glass transition temperature of the material (d-1) to form a protective coating layer was 100° C.

Synthesis Example 16

Synthesis of Polymer (d-2) to Form Protective Coating Layer

As material (d-2) to form a protective coating layer, a polymer alloy was obtained by melt-kneading at 270° C. 25 parts by mass of polyphenylene ether (PPE) and 75 parts by mass of general-purpose polystyrene (GPPS). The glass transition temperature of the material (d-2) to form a protective coating layer was 115° C.

TABLE 2

| | | Composition ratios of units in polymer | | | | | Physical properties of Polymer | |
|---|---|---|---|---|---|---|---|---|
| Synthesis Ex. | Polymer | Units (A) BVE units [mol %] | Units (A) MBVE units [mol %] | Units (B) PDD units [mol %] | Units (C) TFE units [mol %] | Units (D) PPVE units [mol %] | Glass transition temperature [° C.] | Refractive index |
| 11 | (a-1) | 100 | 0 | 0 | 0 | 0 | 108 | 1.342 |
| 12 | (a-4) | 0 | 100 | 0 | 0 | 0 | 124 | 1.328 |
| 13 | (a-5) | 64 | 0 | 26 | 0 | 10 | 125 | 1.329 |
| 14 | (a-6) | 58 | 0 | 28 | 13 | 0 | 128 | 1.330 |

As shown in Table 1, each of the refractive indices of polymers (c-1) to (c-9) obtained in Synthesis Examples 1 to 9 was lower than the refractive index (1.342) of polymer (a-1) contained in the material to form an inner layer.

The refractive index of polymer (c-10) obtained in Synthesis Example 10 was lower than the refractive index (1.328) of polymer (a-4), the refractive index (1.329) of polymer (a-5) or Synthesis Example 17

Synthesis of Polymer (d-3) to Form Protective Coating Layer

As material (d-3) to form a protective coating layer, a polymer alloy was obtained by melt-kneading at 270° C. 31 parts by mass of polyphenylene ether (PPE) and 69 parts by mass of general-purpose polystyrene (GPPS). The glass transition temperature of the material (d-3) to form a protective coating layer was 120° C.

[Production of Plastic Optical Fiber]

Example 1

Figure 5:
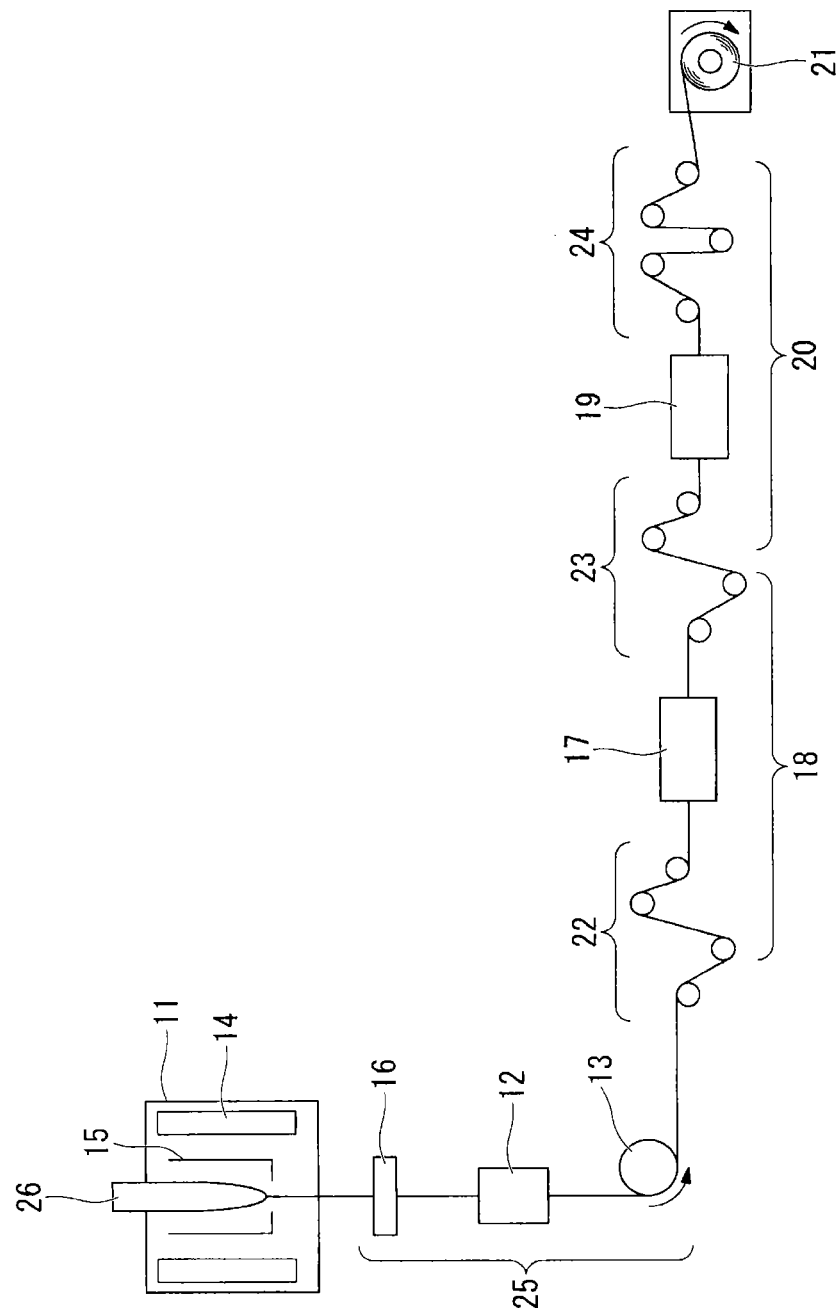
FIG. 5 is an example of the process for producing a plastic optical fiber of the present invention.

As shown in FIG. 5, a plastic optical fiber was produced by a method of spinning by heating a well-fitted combined body comprising an inner layer, an outer layer and a protective coating layer.

Using the material (d-2) to form a protective coating layer produced in Synthesis Example 16, a cylinder having an inside diameter larger than the outside diameter of the cylindrical body (a-1) obtained in Production Example 1 was produced. Into the hollow portion of the cylinder, the cylindrical body (a-1) was well-fitted to obtain a well-fitted combined body. The combined body was heated and spun to obtain an optical fiber. The drawing speed was about 1 m/sec. Further, the obtained optical fiber was stretched by a stretch-treatment device to obtain a gradient index plastic optical fiber having an inner layer radius of 150 μm, an outer layer thickness of 50 μm and a protective coating layer thickness of 800 μm. Further, the drawing speed after the stretch-treatment device was 1.4 m/sec. The production conditions were adjusted so that the fiber stretching ratio would be 144%.

The construction of the plastic optical fiber and the glass transition temperature (Tg) of the material to form a protective coating layer are shown in Table 3.

A film with a thickness of 200 μm of polymer (a-1) used for the material to form an inner layer was produced, and the fracture elongation of the fluorinated polymer (a) was measured at the glass transition temperature of the material to form a protective coating layer in this Example, whereby an elongation exceeding the measurement limit of 500% was shown. The results are shown in Table 3.

A film with a thickness of 200 μm of polymer (c-1) used as the material to form an outer layer was produced, and the fracture elongation of the fluorinated polymer (c) was measured at the glass transition temperature of the material to form a protective coating layer in this Example. The results are shown in Table 3.

With respect to the obtained plastic optical fiber, the transmission loss, the numerical aperture NA, the bending loss, the microscopic fracture evaluation and the fiber stretching yield were measured by the following methods. The results are shown in Table 3.

<Transmission Loss>

Measured in accordance with JIS C6823 (2010 edition). The wavelength for the measurement was 850 nm.

<Numerical Aperture NA>

Measured in accordance with JIS C6823 (2009 edition).

<Bending Loss>

Measured in accordance with JIS C6823 at a bending radius of 5 mm.

<Microscopic Fracture Evaluation>

Figure 6:
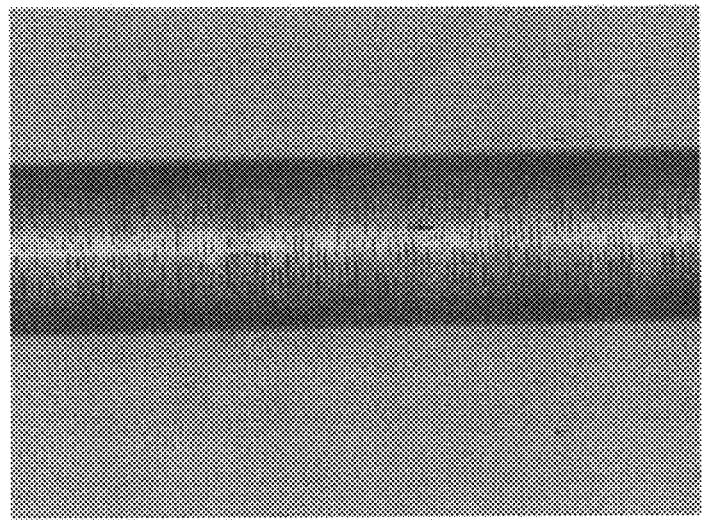
FIG. 6 is an example of the photograph taken after the protective coating layer of the plastic optical fiber in Example 10 was dissolved and removed.
Figure 7:
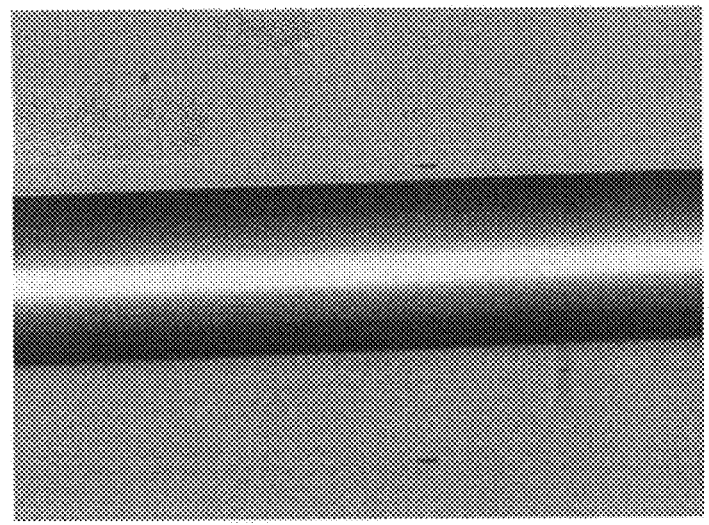
FIG. 7 is an example of the photograph taken after the protective coating layer of the plastic optical fiber in Example 1 was dissolved and removed.

The protective coating layer of the optical fiber after stretching was dissolved and removed by using a solvent capable of dissolving the protective coating layer. The state of the obtained optical fiber bare wire was observed by a microscope. A case where cracking or fracture was not observed in the inner layer and/or the outer layer was evaluated to be ○ (good), and a case where cracking or fracture was observed in the inner layer and/or the outer layer was evaluated to be × (no good). Further, the microscopic photograph in Example 10 is shown in FIG. 6, and the microscopic photograph in Example 1 is shown in FIG. 7.

<Fiber Stretching Yield>

3,000 m of the optical fiber after stretching was cut into 30 optical fibers with a length of 100 m. With respect to each of the optical fibers, the transmission loss, the numerical aperture NA and the bending loss were measured. Among the 30 optical fibers, the ratio of the number of optical fibers which satisfied all of a transmission loss of at most 200 dB/km, a numerical aperture NA of at least 0.2 and a bending loss of at most 0.2, was calculated and taken as the fiber stretching yield.

Examples 2 to 16

Optical fibers were produced and evaluated in the same manner as in Example 1 except that the fiber stretching ratio was changed by changing the materials to form an inner layer, an outer layer and a protective coating layer, and the drawing speed after stretching. The results are shown in Table 3.

TABLE 3

| | Plastic optical fiber | | | | | |
|---|---|---|---|---|---|---|
| | Construction | | | Tg of material to | Fracture elongation | |
| Ex | Material to form inner layer | Material to form outer layer | Material to form protective coating layer | form protective coating layer [° C.] | Fluorinated polymer of (a) [%] | Fluorinated polymer of (c) [%] |
| 1 | (a-1) | (c-1) | (d-2) | 115 | >500 (measurement limit) | 306 |
| 2 | (a-1) | (c-1) | (d-2) | 115 | >500 (measurement limit) | 306 |
| 3 | (a-1) | (c-1) | (d-2) | 115 | >500 (measurement limit) | 306 |
| 4 | (a-1) | (c-1) | (d-2) | 115 | >500 (measurement limit) | 306 |
| 5 | (a-2) | (c-4) | (d-2) | 115 | >500 (measurement limit) | 366 |
| 6 | (a-3) | (c-5) | (d-2) | 115 | >500 (measurement limit) | 386 |
| 7 | (a-1) | (c-7) | (d-1) | 100 | >500 (measurement limit) | 272 |
| 8 | (a-1) | (c-8) | (d-2) | 115 | >500 (measurement limit) | 356 |
| 9 | (a-1) | (c-6) | (d-2) | 115 | >500 (measurement limit) | 380 |
| 10 | (a-1) | (c-9) | (d-1) | 100 | >500 (measurement limit) | 114 |
| 11 | (a-1) | (c-9) | (d-2) | 115 | >500 (measurement limit) | 118 |
| 12 | (a-1) | (c-9) | (d-2) | 115 | >500 (measurement limit) | 118 |
| 13 | (a-1) | (c-1) | (d-3) | 120 | >500 (measurement limit) | 325 |
| 14 | (a-4) | (c-10) | (d-3) | 120 | 291 | 163 |
| 15 | (a-5) | (c-10) | (d-3) | 120 | 310 | 163 |
| 16 | (a-6) | (c-10) | (d-3) | 120 | 290 | 163 |

TABLE 3-continued

Evaluation results of plastic optical fiber

| Ex. | Fiber stretching ratio [%] | Transmission loss [dB/km] | Numerical aperture NA[-] | Bending loss [dB] | Microscopic fracture evaluation | Fiber stretching yield [%] | Heat resistance test Transmission loss [dB/km] |
|---|---|---|---|---|---|---|---|
| 1  | 144 | 49     | 0.25 | 0.15 | ○ | 96 | — |
| 2  | 225 | 85     | 0.25 | 0.10 | ○ | 86 | — |
| 3  | 300 | 193    | 0.23 | 0.09 | ○ | 90 | — |
| 4  | 420 | >1,000 | 0.15 | 0.21 | x | 0  | — |
| 5  | 175 | 45     | 0.24 | 0.11 | ○ | 90 | — |
| 6  | 143 | 48     | 0.23 | 0.09 | ○ | 96 | — |
| 7  | 245 | 105    | 0.24 | 0.12 | ○ | 76 | — |
| 8  | 220 | 93     | 0.25 | 0.15 | ○ | 83 | — |
| 9  | 140 | >1,000 | 0.24 | —    | x | 0  | — |
| 10 | 139 | 40     | 0.15 | 0.35 | x | 0  | — |
| 11 | 140 | 50     | 0.14 | 0.37 | x | 0  | — |
| 12 | 114 | 47     | 0.24 | 0.17 | ○ | 53 | — |
| 13 | 142 | 52     | 0.24 | 0.15 | ○ | 88 | >1,000 |
| 14 | 138 | 38     | 0.25 | 0.17 | ○ | 84 | 42 |
| 15 | 140 | 196    | 0.23 | 0.21 | ○ | 78 | 212 |
| 16 | 140 | 45     | 0.25 | 0.15 | ○ | 83 | 48 |

Of the optical fibers obtained in Examples 1 to 3, 5 to 8 and 13 to 16, the transmission loss and the bending loss were small, and the fiber yield after stretching (fiber stretching yield) was good.

Of the optical fiber obtained in Example 9, the transmission loss was large. Example 9 is an Example wherein the glass transition temperature of polymer (c-6) as the material to form an outer layer is lower than the glass transition temperature of polymer (a-1) as the material to form an inner layer. From the results, it is considered that at the time of producing the optical fiber, the inner layer solidified before the outer layer, whereby the inner layer was stretched along with elongation of the outer layer, and as a result, polymer (a-1) forming the inner layer was oriented, and the scattering loss became large.

Of the fibers obtained in Examples 4, 10 and 11, the numerical aperture NA was small, and the fiber yield after stretching (fiber stretching yield) was zero. Examples 4, 10 and 11 are Examples wherein the fracture elongation of the fluorinated polymer (c) is smaller than the fiber stretching ratio. From FIG. 6, it is confirmed that fine cracks are formed in the outer layer of the optical fiber bare wire obtained in Example 10. From this, it is considered that the fiber stretching ratio became larger than the fracture elongation of the fluorinated polymer (c), whereby cracks were formed in the outer layer of the optical fiber, and the numerical aperture NA decreased.

Of the optical fiber obtained in Example 12, the fiber stretching yield was low. Example 12 is an Example wherein the fiber stretching ratio is smaller than 120%. It is considered that since the fiber stretching ratio was low at a level of 114%, no adequate mechanical strength was imparted to the optical fiber, and cracks were formed in the outer layer of the optical fiber by the tension during the stretching.

In order to evaluate the heat resistance, the plastic optical fibers in Example 13 to 16 wherein the material (d-3) with a glass transition temperature of 120° C. was used for the protective coating layer, were stored for 5,000 hours in an oven of 115° C., and then, the transmission loss was measured again, and the results are shown in Table 3.

In Example 13, the transmission loss remarkably increased. This is considered to be such that by the storage for a long period of time at a temperature higher than the glass transition temperature of 108° C. of the polymer forming the inner layer, the inner layer was softened, and the structural irregularity increased.

Whereas, in Examples 14 to 16 wherein the glass transition temperature of the polymer forming the inner layer was higher than 120° C., no substantial change was observed in the transmission loss. It is considered that by using a material with a high glass transition temperature as the material to form the inner layer, it is possible to increase the heat resistance of the plastic optical fiber.

INDUSTRIAL APPLICABILITY

The plastic optical fiber of the present invention has good optical fiber properties such as low transmission loss and low bending loss and at the same time, has no cracks. Accordingly, it is useful for applications such as indoor wirings, notebook PCs, clamshell phones, etc.

This application is a continuation of PCT Application No. PCT/JP2013/073415, filed on Aug. 30, 2013, which is based upon and claims the benefit of priority from Japanese Patent Application No. 2012-199551 filed on Sep. 11, 2012. The contents of those applications are incorporated herein by reference in its entirety.

REFERENCE SYMBOLS

1: Inner layer
2: Outer layer
3: Refractive index level of the outermost portion of the inner layer
4: Refractive index level of the outer layer
11: Heating furnace
12: Cooling device
13: Drawing device
14: Heater
15: Core tube
16: Wire diameter monitor
17: Heating furnace for stretching
18: Stretching apparatus
19: Heating furnace for annealing
20: Annealing apparatus
21: Rewinder
22, 23, 24: Rollers for transportation 25: Wire drawing apparatus
26: Well-fitted combined body

What is claimed is:

1. A plastic optical fiber comprising
an inner layer,
an outer layer covering the outer periphery of the inner layer and having a refractive index lower than the refractive index of the inner layer, and
a protective coating layer covering the outer periphery of the outer layer, wherein
the material forming the inner layer contains an amorphous fluorinated polymer (a) having no C—H bond,
the material forming the outer layer contains an amorphous fluorinated polymer (c) which may have a C—H bond only at a terminal of the main chain,
the glass transition temperature (Tgc) of the fluorinated polymer (c) is at least the glass transition temperature (Tga) of the fluorinated polymer (a),
the plastic optical fiber is a stretched one,
the following fracture elongation of the fluorinated polymer (a) and the following fracture elongation of the fluorinated polymer (c) are at least 120% and larger than the stretching ratio in the above stretching,
a fluorinated polymer film having a thickness of 200 μm is punched out in a shape of a test piece type L stipulated in ASTM D1822 to form a test piece; in accordance with JIS K7161-1994, a tensile test of the test piece is conducted at a tensile speed of 10 mm/min. at the glass transition temperature of the material forming the protective coating film, whereupon the fracture elongation (%) of the fluorinated polymer is calculated from the following formula (II):

Fracture elongation of fluorinated polymer=increase in gauge length of the test piece at the time of fracture/gauge length of the test piece before the tensile test×100      (II).

2. The plastic optical fiber according to claim 1, wherein the fluorinated polymer (c) is a fluorinated polymer having no C—H bond.

3. The plastic optical fiber according to claim 1, wherein the fluorinated polymer (c) is a copolymer which contains the following units (A) and units (B) and further contains one or both of units (C) and units (D):
units (A): units formed by cyclopolymerization of a fluorinated monomer having at least two polymerizable double bonds,
units (B): units formed by polymerization of a monomer having a polymerizable double bond between a carbon atom constituting a ring and a carbon atom not constituting a ring, or a monomer having a polymerizable double bond between two carbon atoms constituting a ring,
units (C): units formed by polymerization of a perfluoroolefin or a perfluoroolefin containing a halogen atom other than a fluorine atom,
units (D): units formed by polymerization of a perfluorovinyl ether monomer.

4. The plastic optical fiber according to claim 3, wherein the fluorinated polymer (c) is a copolymer comprising the above units (A), units (B) and units (C) in a ratio of the units (A):(B):(C) being from 30 to 75:from 20 to 50:from 5 to 33 (mol %), a copolymer comprising the above units (A), units (B) and units (D) in a ratio of the units (A):(B):(D) being from 30 to 70:from 20 to 50:from 1 to 20 (mol %), or a copolymer comprising the above units (A), units (B), units (C) and units (D) in a ratio of the units (A):(B):(C):(D) being from 30 to 70:from 20 to 50:from 5 to 30: from 1 to 19 (mol %).

5. The plastic optical fiber according to claim 3, wherein the fluorinated polymer (c) is a copolymer comprising the above units (A), units (B) and units (C) in a ratio of the units (A):(B):(C) being from 17 to 75:from 20 to 50:from 5 to 33 (mol %), a copolymer comprising the above units (A), units (B) and units (D) in a ratio of the units (A):(B):(D) being from 40 to 65:from 20 to 40:from 5 to 20 (mol %), or a copolymer comprising the above units (A), units (B), units (C) and units (D) in a ratio of the units (A):(B):(C):(D) being from 1 to 74:from 20 to 50:from 5 to 30: from 1 to 19 (mol %).

6. The plastic optical fiber according to claim 1, wherein the fluorinated polymer (c) is a copolymer comprising the above units (B) and units (C).

7. The plastic optical fiber according to claim 6, wherein the fluorinated polymer (c) is a copolymer comprising the above units (B) and units (C) in a ratio of the units (B):(C) being from 50 to 95:from 5 to 50 (mol %).

8. The plastic optical fiber according to claim 1, wherein the refractive index of the fluorinated polymer (c) is lower by at least 0.003 than the refractive index of the fluorinated polymer (a).

9. The plastic optical fiber according to claim 1, wherein the fluorinated polymer (a) is a polymer having only units formed by cyclopolymerization of a fluorinated monomer having at least two polymerizable double bonds.

10. The plastic optical fiber according to claim 1, wherein the fluorinated polymer (a) is a copolymer which contains the following units (A) and units (B) and further contains one or both of units (C) and units (D):
units (A): units formed by cyclopolymerization of a fluorinated monomer having at least two polymerizable double bonds,
units (B): units formed by polymerization of a monomer having a polymerizable double bond between a carbon atom constituting a ring and a carbon atom not constituting a ring, or a monomer having a polymerizable double bond between two carbon atoms constituting a ring,
units (C): units formed by polymerization of a perfluoroolefin or a perfluoroolefin containing a halogen atom other than a fluorine atom,
units (D): units formed by polymerization of a perfluorovinyl ether monomer.

11. The plastic optical fiber according to claim 10, wherein the fluorinated polymer (a) is a copolymer comprising the above units (A), units (B) and units (C) in a ratio of the units (A):(B):(C) being from 30 to 75:from 20 to 50:from 5 to 33 (mol %), a copolymer comprising the above units (A), units (B) and units (D) in a ratio of the units (A):(B):(D) being from 30 to 70:from 20 to 50:from 1 to 20 (mol %), or a copolymer comprising the above units (A), units (B), units (C) and units (D) in a ratio of the units (A):(B):(C):(D) being from 30 to 70:from 20 to 50:from 5 to 30: from 1 to 19 (mol %).

12. The plastic optical fiber according to claim 1, wherein the fluorinated polymer (a) is a fluorinated polymer having a fluorinated aliphatic cyclic structure in its main chain.

13. The plastic optical fiber according to claim 1, wherein the inner layer contains, in a matrix composed of the fluorinated polymer (a), a compound (b) having a refractive index higher than the fluorinated polymer (a), and a gradient index structure is formed by distribution of the compound (b).

14. The plastic optical fiber according to claim 1, wherein the glass transition temperature of the material forming the protective coating layer is from 100 to 150° C.

15. A method for producing the plastic optical fiber as defined in claim 1, which comprises spinning, while stretching in an axial direction, a multi-layer structure wherein the fluorinated polymer (a) is disposed at its center, and a layer of the fluorinated polymer (c) and a layer of the material forming the protective coating layer are disposed concentrically in a radial direction from the center.

* * * * *